United States Patent
Sekiya et al.

(10) Patent No.: US 8,733,126 B2
(45) Date of Patent: May 27, 2014

(54) VEHICLE AIR-CONDITIONING APPARATUS

(75) Inventors: Sachio Sekiya, Hitachinaka (JP);
Tadashi Osaka, Kashiwa (JP); Itsuro Sawada, Hitachinaka (JP); Yuto Imanishi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 861 days.

(21) Appl. No.: 12/948,428

(22) Filed: Nov. 17, 2010

(65) Prior Publication Data
US 2011/0113800 A1   May 19, 2011

(30) Foreign Application Priority Data
Nov. 18, 2009 (JP) ................. 2009-262528

(51) Int. Cl.
F25B 41/00 (2006.01)
F25B 41/04 (2006.01)
B60H 1/32 (2006.01)
F25B 1/00 (2006.01)
B60H 3/00 (2006.01)

(52) U.S. Cl.
USPC ............. 62/513; 62/222; 62/244; 62/498; 165/42

(58) Field of Classification Search
USPC ........ 62/151, 498, 222, 228.1, 430, 513, 184, 62/185, 244; 165/202, 42
See application file for complete search history.

(56) References Cited

U.S. PATENT DOCUMENTS

2005/0178523 A1   8/2005   Itoh et al.
2007/0157647 A1   7/2007   Duhme et al.

FOREIGN PATENT DOCUMENTS

| DE | 10 2004 035 879 A1 | 2/2006 |
|---|---|---|
| JP | 7-4326 A | 1/1995 |
| JP | 2005-263200 A | 9/2005 |
| JP | 2005-273998 A | 10/2005 |
| JP | 2008-230594 A | 10/2008 |
| WO | WO 2008/127527 A1 | 10/2008 |

OTHER PUBLICATIONS

Japanese Office Action with English Translation Dated Jul. 2, 2013.
"Thermodynamic Cycle System for Moving Vehicle", U.S. Appl. No. 12/828,901, filed Aug. 18, 2010.
European Search Report dated Feb. 25, 2011 (Six (6) pages).

*Primary Examiner* — Chen Wen Jiang
(74) *Attorney, Agent, or Firm* — Crowell & Moring LLP

(57) ABSTRACT

A vehicle air-conditioning apparatus, including: a refrigerant circulation channel that flows a refrigerant, the refrigerant circulation channel provided in a refrigeration cycle system including, as connected in a cyclic pattern, a compressor for the refrigerant, an outdoor heat-exchanger exchanging heat between the refrigerant and an outdoor air, an expansion valve reducing pressure of the refrigerant, and an air-conditioning heat-exchange circuit exchanging heat between the refrigerant and air to be introduced into a vehicle interior; and an equipment heat-exchange circuit connected in parallel to the circuit and exchanging heat between the refrigerant and in-vehicle equipment. The circuit includes a cooling heat-transfer medium circulation channel that circulates a heat-transfer medium for cooling. The cooling channel has a cooling heat-exchanger exchanging heat between the refrigerant in the channel and a cooling heat-transfer medium for cooling the in-vehicle equipment and a cooling circulation pump for circulating the cooling heat-transfer medium.

14 Claims, 14 Drawing Sheets

US 8,733,126 B2

VEHICLE AIR-CONDITIONING APPARATUS

INCORPORATION BY REFERENCE

The disclosure of the following priority application is herein incorporated by reference: Japanese Patent Application No. 2009-262528 filed Nov. 18, 2009.

BACKGROUND OF THE INVENTION

1. Field of the Invention

The present invention relates to a vehicle air-conditioning apparatus, i.e., an air-conditioning apparatus for use in a vehicle.

2. Description of Related Art

There have been known technologies concerning a cooling system for a vehicle comprising a primary circulation channel and a secondary circulation channel. The secondary circulation channel circulates heat-transfer medium through a vehicle interior (i.e., indoor) air-conditioning heat-exchanger and in-vehicle devices or components (i.e., equipment set up on the vehicle) to perform air-conditioning and cool the equipment set up on the vehicle. The primary circulation channel for a refrigeration cycle system exchanges heat with the heat-transfer medium in the secondary circulation channel via an intermediate heat-exchanger provided in the secondary circulation channel. In this system, cooling of the vehicle interior and cooling of in-vehicle heat-liberation components such as batteries and DC/DC converters are performed through the primary circulation channel of the refrigerating system (see, for example, JP 2005-273998 A1).

Also, there have been known technologies concerning an air-conditioning system for vehicles comprising a primary circulation channel and a secondary circulation channel; the secondary circulation channel circulates heat-transfer medium through a heater core and the primary circulation channel serves as a heat pump (refrigeration cycle system) having an intermediate heat-exchanger provided in the secondary circulation channel in order to perform heat-exchange with the heat-transfer medium in the secondary circulation channel. In a heating mode, the heat-transfer medium in the secondary circulation channel is heated by the heat generated in the primary circulation channel of the heat pump through the intermediate heat-exchanger, and further the heat-transfer medium in the secondary circulation channel is heated by a heater, so that sufficient vehicle interior heating can be performed even when the external temperature is extremely low (see for example, JP 2008-230594 A1).

SUMMARY OF THE INVENTION

However, in the cooling system for a vehicle disclosed in JP 2005-273998 A1, the heat-transfer medium for cooling in the secondary circulation channel flows from the air-conditioning heat-exchanger to the heat-liberation components set up on the vehicle, so that the heat-transfer medium could not be set at temperatures that are most suitable for air-conditioning in the vehicle interior and for cooling the heat-liberation components, respectively, simultaneously. For example, when it is required to cool the heat-transfer medium to about 10° C. for cooling the vehicle interior, the heat-transfer medium that is circulated through the in-vehicle heat-liberation components is to be cooled to about 10° C. If the temperature of an in-vehicle heat-liberation component becomes lower than a temperature of an outside air, heat flows in from the outside air to the in-vehicle heat-liberation component. The refrigeration system needs to perform extra cooling corresponding to the amount of heat that flew in. This increases power consumption by the refrigeration cycle system.

On the other hand, the air-conditioning system for a vehicle disclosed in JP 2008-230594 A1 has a construction such that the heat-transfer medium in the secondary circulation channel is heated by using an intermediate heat-exchanger and a heater in combination. In this construction, the temperature at which condensation occurs in the intermediate heat-exchanger is influenced by the temperature of the heat-transfer medium therein. When the heater is used, the temperature of the heat-transfer medium increases, so that the temperature at which refrigeration is performed by the intermediate heat-exchanger increases, resulting in that the power consumption by the primary circulation channel of the heat pump increases in order to get the same performance of air heating. In other words, the power consumption for the primary circulation channel of the heat pump as well as the power consumption by the heater increases.

According to a first aspect, the invention provides a moving vehicle air-conditioning apparatus to be set up on a vehicle, the apparatus comprising: a refrigerant circulation channel through which a refrigerant flows, the refrigerant circulation channel being provided in a refrigeration cycle system including, as connected in a cyclic pattern, a compressor that compresses the refrigerant, an outdoor heat-exchanger that performs heat-exchange between the refrigerant and an outdoor air, an expansion valve that reduces pressure of the refrigerant, and an air-conditioning heat-exchange circuit that performs heat-exchange between the refrigerant and air to be introduced into a vehicle interior; and an equipment heat-exchange circuit that is connected in parallel to the air-conditioning heat-exchange circuit and performs heat-exchange between the refrigerant and equipment set up on the vehicle, wherein the equipment heat-exchange circuit includes a cooling heat-transfer medium circulation channel that circulates therein a cooling heat-transfer medium for cooling equipment set up on the vehicle, which channel is different from the refrigerant circulation channel of the refrigeration cycle system, and the cooling heat-transfer medium circulation channel has provided therein a cooling heat-exchanger that performs heat-exchange between the refrigerant in the refrigerant circulation channel of the refrigeration cycle system and the cooling heat-transfer medium and a cooling circulation pump for circulating the cooling heat-transfer medium between the equipment set up on the vehicle and the cooling heat-exchanger.

According to a second aspect, the invention provides a moving vehicle air-conditioning apparatus according to the first aspect, wherein the air-conditioning heat-exchange circuit includes an air-conditioning heat-transfer medium circulation channel that circulates therein an air-conditioning heat-transfer medium, which channel is different from the refrigerant circulation channel of the refrigeration cycle system, and the air-conditioning heat-transfer medium circulation channel includes an air-conditioning heat-exchanger that performs heat-exchange between the refrigerant in the refrigerant circulation channel of the refrigeration cycle system and an air-conditioning heat-transfer medium for air-conditioning the vehicle interior, a first indoor heat-exchanger that performs heat-exchange between the air to be introduced into the vehicle interior and the air-conditioning heat-transfer medium, and an air-conditioning circulation pump for circulating the air-conditioning heat-transfer medium between the air-conditioning heat-exchanger and the first indoor heat-exchanger.

According to a third aspect, the invention provides a moving vehicle air-conditioning apparatus according to the first aspect, wherein the air-conditioning heat-exchange circuit includes a first indoor heat-exchanger that performs heat-exchange between the air to be introduced into the vehicle interior and the refrigerant, and the refrigerant in the refrigerant circulation channel of the refrigerant cycle system is circulated to the first indoor heat-exchanger as the air-conditioning heat-transfer medium for air-conditioning the vehicle interior.

According to a fourth aspect, the invention provides a moving vehicle air-conditioning apparatus according to the first aspect, wherein the air-conditioning heat-exchange circuit is connected to the expansion valve through an air-conditioning expansion valve that reduces pressure of the refrigerant, and the cooling heat-exchanger in the cooling heat-transfer medium circulation channel is connected to the expansion valve through a cooling expansion valve that reduces pressure of the refrigerant.

According to a fifth aspect, the invention provides a moving vehicle air-conditioning apparatus according to the first aspect, further comprising a first channel-switching valve wherein the air-conditioning heat-exchange circuit and the outdoor heat-exchanger are connected to the compressor through the first channel-switching valve, so that one of the air-conditioning heat-exchange circuit and the outdoor heat-exchanger is connected to a discharge pipe of the compressor and the other is connected to an intake pipe of the compressor, and the connection of the air-conditioning heat-exchange circuit and the outdoor heat-exchanger with the compressor is switched by the first channel-switching valve.

According to a sixth aspect, the invention provides a moving vehicle air-conditioning apparatus according to the second aspect, wherein the cooling heat-transfer medium circulation channel includes a second indoor heat-exchanger that performs heat-exchange between the air to be introduced into the vehicle interior and the cooling heat-transfer medium, and the second indoor heat-exchanger is arranged on downstream side of the flow of air from the first indoor heat-exchanger so that the air to be introduced into the vehicle interior that has passed through the first indoor heat-exchanger can pass the second indoor heat-exchanger.

According to a seventh aspect, the invention provides a moving vehicle air-conditioning apparatus according to the sixth aspect, further comprising: a bypass channel that bypasses the second indoor heat-exchanger; and a flow control valve that controls flow rate of the cooling heat-transfer medium flowing through the second indoor heat-exchanger and the bypass channel.

According to an eighth aspect, the invention provides a moving vehicle air-conditioning apparatus according to the fifth aspect, further comprising: a second channel-switching valve wherein the cooling heat-exchanger of the cooling heat-transfer medium circulation channel is switchably connected to the discharge pipe or the intake pipe of the compressor through the second channel-switching valve.

According to a ninth aspect, the invention provide a moving vehicle air-conditioning apparatus according to the first aspect, further comprising: a receiver tank wherein the receiver tank is provided at a diverging point where the refrigerant discharged from the expansion valve in the refrigerant circulation channel of the refrigeration cycle system is diverged into a portion that flows through the air-conditioning heat-exchange circuit and a portion that flows through the cooling heat-exchange circuit.

According to a tenth aspect, the invention provides a moving vehicle air-conditioning apparatus according to the second aspect, further comprising: a control device that controls air-conditioning of the vehicle interior and cooling of the equipment set up on the vehicle; and a detector that detects a temperature of the air-conditioning heat-transfer medium, wherein upon a cooling operation in which the outdoor heat-exchanger is operated as a condenser and the air-conditioning heat-exchange circuit is operated as an evaporator, the control device controls a rotation speed of the compressor such that a temperature of the air-conditioning heat-transfer medium is set to be a target temperature.

According to an eleventh aspect, the invention provides a moving vehicle air-conditioning apparatus according to the fourth embodiment, further comprising: a control device that controls air-conditioning of the vehicle interior and cooling of the equipment set up on the vehicle; a detector that detects a temperature of the air outside the vehicle interior; and a detector that detects a temperature of the cooling heat-transfer medium, wherein upon a cooling operation in which the air-conditioning heat-exchange circuit and the cooling heat-exchanger are operated as evaporators, the control device sets a target temperature of the cooling heat-transfer medium to a temperature higher than the temperature of the air outside the vehicle interior, and controls the cooling expansion valve such that the temperature of the cooling heat-transfer medium reaches the target temperature.

According to a twelfth aspect, the invention provides a moving vehicle air-conditioning apparatus according to the eleventh aspect, further comprising: a detector that detects a temperature of the refrigerant that flows out from the air-conditioning heat-exchange circuit; and a detector that detects a temperature of the refrigerant that flows out from the cooling heat-exchanger, wherein upon the cooling operation, the control device controls the cooling expansion valve such that the temperature of the refrigerant that flows out from the cooling heat-exchanger is higher than the temperature of the refrigerant that flows out from the air-conditioning heat-exchange circuit.

According to a thirteenth aspect, the invention provides a moving vehicle air-conditioning apparatus according to the seventh aspect, further comprising: a control device that controls air-conditioning of the vehicle interior and cooling of the equipment set up on the vehicle, wherein upon a cooling operation in which the outdoor heat-exchanger is operated as a condenser and the air-conditioning heat-exchange circuit and the cooling heat-exchanger are operated as evaporators, the control device controls the operation of the air-conditioning apparatus such that a portion or all of the cooling heat-transfer medium is flown to the second indoor heat-exchanger through the flow control valve to allow the air to be introduced into the vehicle interior that has been cooled in the first indoor heat-exchanger is heated in the second indoor heat-exchanger.

According to a fourteenth aspect, the invention provides a moving vehicle air-conditioning apparatus according to the eighth aspect, further comprising: a control device that controls air-conditioning of the vehicle interior and cooling of the equipment set up on the vehicle, wherein upon a cooling operation in which the outdoor-heat-exchanger is operated as a condenser and the air-conditioning heat-exchange circuit is operated as an evaporator, the control device controls the operation of the air-conditioning apparatus such that the second channel-switching valve switches the flow of the refrigerant so that the cooling heat-exchanger is operated as a condenser to allow the cooling heat-transfer medium of the cooling heat-transfer medium circulation channel to be heated by the refrigerant in the refrigerant circulation channel of the refrigeration cycle system.

According to a fifteenth aspect, the invention provides a moving vehicle air-conditioning apparatus according to the seventh aspect, further comprising: a control device that controls air-conditioning of the vehicle interior and cooling of the equipment set up on the vehicle, wherein the control device controls the operation of the air-conditioning apparatus such that an operation mode of the air-conditioning apparatus is switched by the first channel-switching valve to a heating operation mode in which the air-conditioning heat-exchange circuit is operated as a condenser and the outdoor heat-exchanger is operated as an evaporator, a flow of the refrigerant to the cooling heat-exchanger is shut off by the cooling expansion valve, and the cooling heat-transfer medium is flown into the second indoor heat-exchanger through the flow control valve.

According to a sixteenth aspect, the invention provides a moving vehicle air-conditioning apparatus according to claim the fifteenth aspect, wherein upon the heating operation, the control device controls the rotation speed of the compressor such that a temperature of the cooling heat-transfer medium reaches a target temperature.

According to a seventeenth aspect, the invention provides a moving vehicle air-conditioning apparatus according to the eighth aspect, further comprising: a control device that controls air-conditioning of the vehicle interior and cooling of the equipment set up on the vehicle, wherein the control device controls the operation of the air-conditioning apparatus such that an operation mode of the air-conditioning apparatus is switched by the first channel-switching valve to a heating operation mode in which the air-conditioning heat-exchange circuit is operated as a condenser and the outdoor heat-exchanger is operated as an evaporator, the cooling heat-exchanger is switched by the second channel-switching valve so as to be operated as an evaporator, and the cooling heat-transfer medium is flown into the bypass channel by the flow control valve.

According to an eighteenth aspect, the invention provides a moving vehicle air-conditioning apparatus according to the seventh aspect, further comprising: a control device that controls air-conditioning of the vehicle interior and cooling of the equipment set up on the vehicle, wherein the control device controls the operation of the air-conditioning apparatus to be switched to a defrosting operation in which the outdoor heat-exchanger is operated as a condenser and the cooling heat-exchanger is operated as an evaporator, the flow of the refrigerant to the air-conditioning heat-exchange circuit is shut off by the air-conditioning expansion valve, and the cooling heat-transfer medium is flown into the bypass channel by the flow control valve, thereby defrosting the outdoor heat-exchanger.

According to a nineteenth aspect, the invention provides a moving vehicle air-conditioning apparatus according to the eighteenth aspect, further comprising: an outdoor fan that blows air outside the vehicle interior into the outdoor heat-exchanger; and a detector that detects vehicle speed of the vehicle, wherein upon the defrosting operation, the control device controls the outdoor fan to be rotated in a direction opposite to a direction in which the outdoor fan is rotated upon non-defrosting operation so that the speed of rotation of the outdoor fan in the opposite direction is controlled in response to the vehicle speed.

According to a twentieth aspect, the invention provides a moving vehicle air-conditioning apparatus according to the first aspect, wherein the air-conditioning apparatus includes a plurality pieces of equipment set up on the vehicle, and the plurality of pieces of the equipment is arranged along a direction of flow of the cooling heat-transfer medium from upstream to downstream in order of increasing permissible temperature or increasing thermal time constant.

According to the present invention, the temperatures of cooling media that flow in a heat-exchange circuit for air-conditioning and a heat-exchange circuit for in-vehicle equipment can be set at most suitable temperatures, respectively, so that the power consumption by the refrigeration cycle system can be minimized.

Other objects, features and advantages of the present invention will become apparent from the following description of the embodiments of the invention taken in conjunction with the accompanying drawings.

DESCRIPTION OF PREFERRED EMBODIMENTS

First Embodiment

Figure 1:
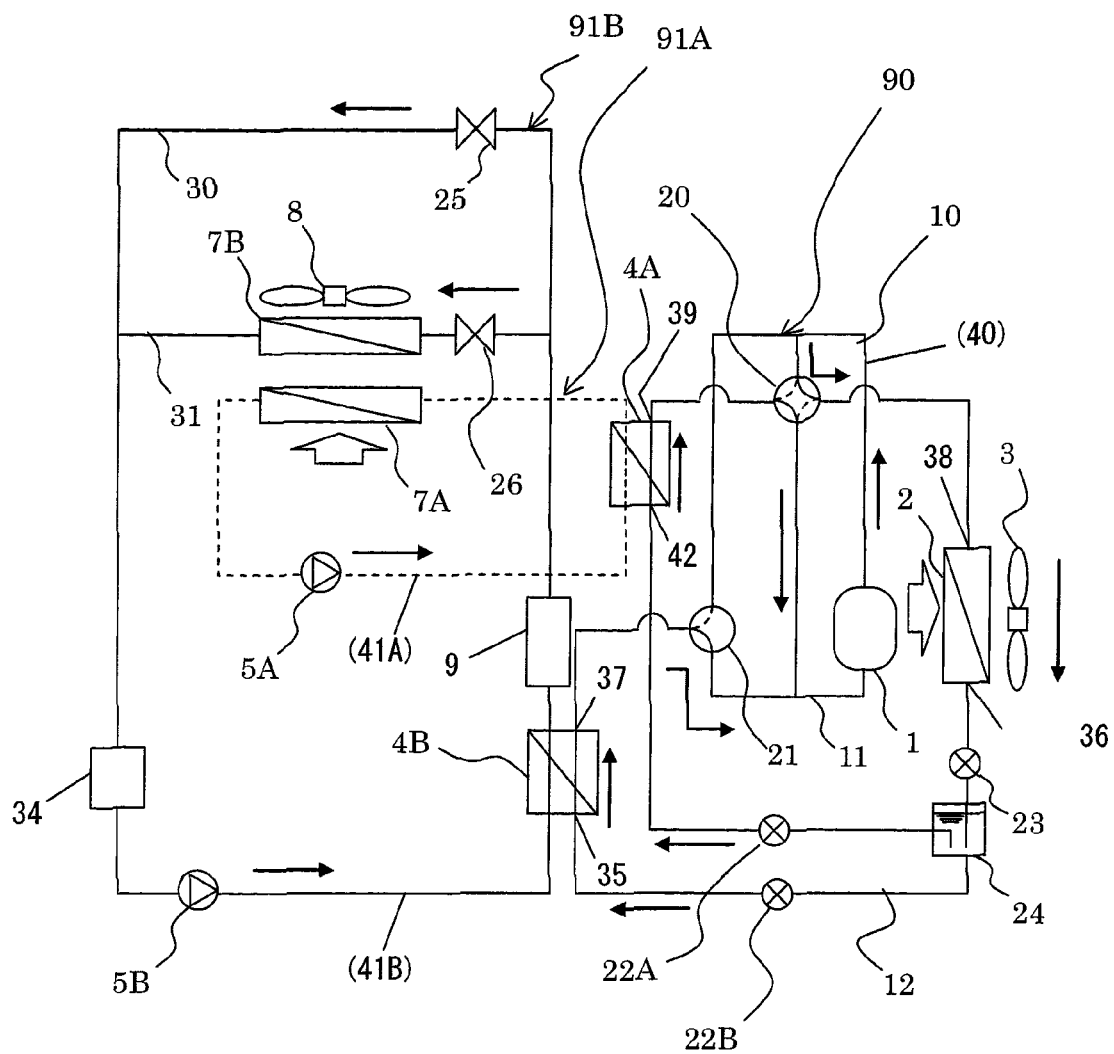
FIG. 1 presents a schematic diagram showing a construction of a vehicle air-conditioning apparatus according to a first embodiment of the present invention, illustrating the flow of a refrigerant upon a heating operation.
Figure 2:
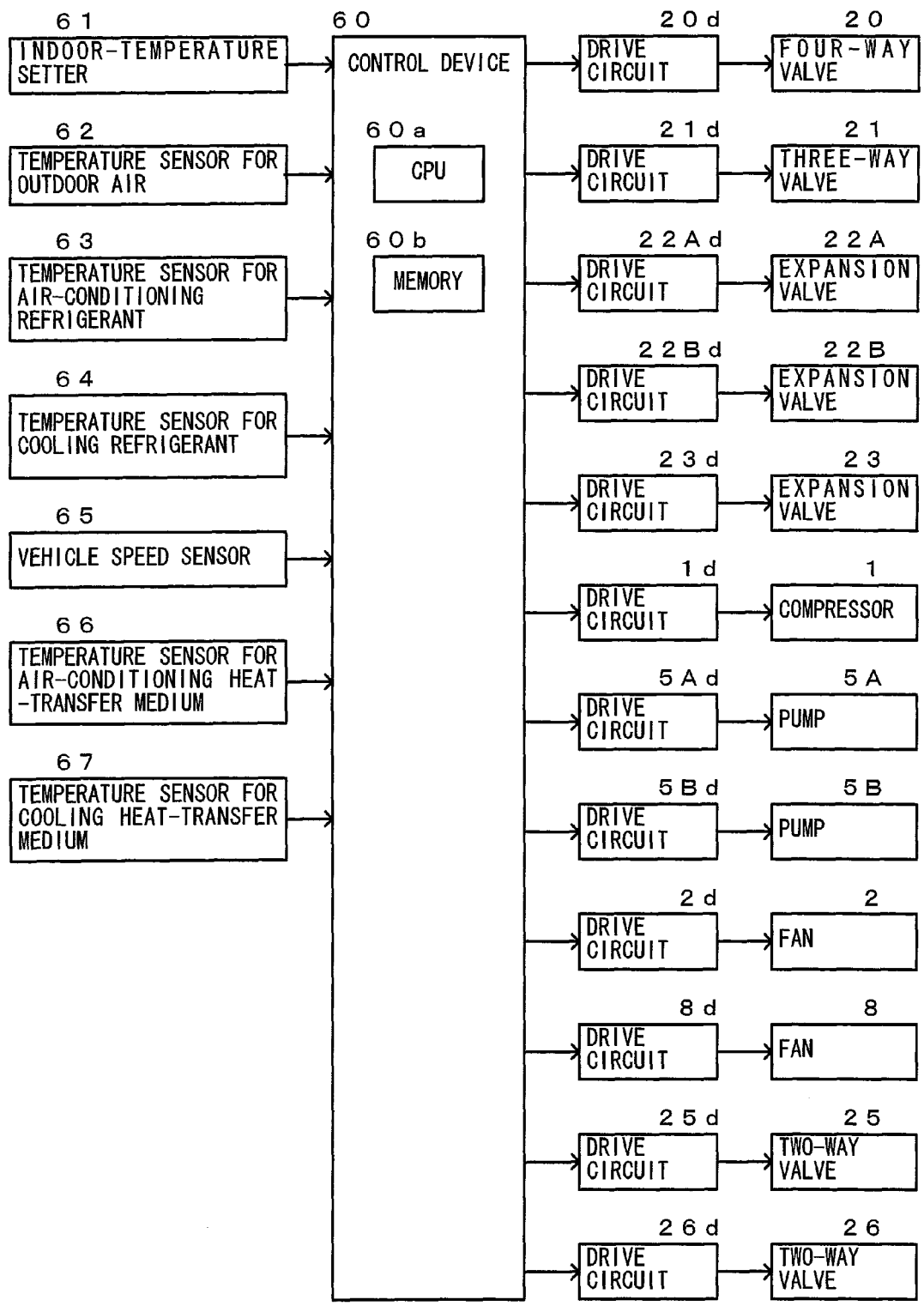
FIG. 2 presents a block diagram showing an electric circuit of a vehicle air-conditioning apparatus according to the first embodiment of the present invention.

FIG. 1 presents a schematic diagram showing a construction of a vehicle air-conditioning apparatus according to a first embodiment of the present invention. FIG. 2 presents a block diagram showing an electric circuit of a vehicle air-conditioning apparatus according to the first embodiment of the present invention. The vehicle air-conditioning apparatus 1 according to the first embodiment comprises three heat-transfer medium circulation channels. More particularly, a first one is a cooling medium (or refrigerant) circulation channel (or primary circulation channel) 90 of a refrigeration cycle system, which performs compression, condensation, expansion and evaporation of a refrigerant 40. A second one is a heat-transfer medium circulation channel for air-conditioning (hereafter, air-conditioning heat-transfer medium circulation channel) (or secondary circulation channel A) 91A, which is connected to the refrigerant circulation channel 90 of the refrigeration cycle system (hereafter, referred to refrigerant circulation-cycle refrigerant-circulation channel 90) via a heat-exchanger for air-conditioning (hereafter, air-conditioning heat-exchanger) 4A and circulates a heat-transfer medium 41A between the air-conditioning heat-exchanger 4A and an indoor heat-exchanger 7A set up on the vehicle in order to perform cooling or heating the vehicle interior (sometimes "vehicle interior" being simply referred to as "room"). A third one is a channel for circulating a heat-transfer medium for cooling (hereafter, "heat-transfer medium for cooling" being referred to as "cooling heat-transfer medium" and "channel for circulating a heat-transfer medium for cooling" being referred to as "cooling heat-transfer medium circulation channel") (secondary circulation channel B) 91B, which is connected to the refrigeration-cycle refrigerant-circulation channel 90 via a heat-exchanger for cooling (hereafter, cooling heat-exchanger) 4B and circulates a heat-transfer medium 41B thorough the indoor heat-exchanger 7B and a reservoir tank 34 in order to perform cooling or heating of a heat-liberation component 9 and to perform air cooling or air heating in the vehicle interior.

The refrigeration-cycle refrigerant-circulation channel 90 comprises a compressor 1 that compresses the refrigerant 40, an outdoor heat-exchanger 2 that performs heat-exchange between the refrigerant 40 and outside air, a liquid pipe 12, a pressure reduction means for reducing pressure of the refrigerant 40, and expansion valves 23, 22A, 22B, a receiver tank 24, an air-conditioning heat-exchanger 4A that performs heat-exchange with the air-conditioning heat-transfer medium 41A that flows in the air-conditioning heat-transfer medium circulation channel 91A, the cooling heat-exchanger 4B that performs heat-exchange with the cooling heat-transfer medium 41B that flows in the cooling heat-transfer medium circulation channel 91B, and a four-way valve 20 and a three-way valve 21 that switch the refrigerants. The outdoor heat-exchanger 2 includes an outdoor fan 3 that blows in air outside the vehicle (outside air) to the outdoor heat-exchanger 2.

In the vehicle air-conditioning apparatus according to the first embodiment, the air-conditioning heat-exchanger 4A of the air-conditioning heat-transfer medium circulation channel 91A and the cooling heat-exchanger 4B of the cooling heat-transfer medium circulation channel 91B connected in parallel in the refrigeration-cycle refrigerant-circulation channel 90. That is, the air-conditioning heat-transfer medium circulation channel 91A and the cooling heat-transfer medium circulation channel 91B are connected in parallel in the refrigeration-cycle refrigerant-circulation channel 90. One end 35 of the air-conditioning heat-exchanger 4A and one end 42 of the cooling heat-exchanger 4B for cooling are connected to the receiver tank 24 of the liquid pipe 12 through the expansion valves 22A, 22B, respectively. The other end 39 of the air-conditioning heat-exchanger 4A is connected to the four-way valve 20 and is switchably connected to either one of discharge pipe 10 or intake pipe 11 of the compressor 1 by switching the four-way valve 20. The other end 37 of the cooling heat-exchanger 4B is connected to the three-way valve 21 and is switchably connected to either one of discharge pipe 10 or intake pipe 11 of the compressor 1 by switching the three-way valve 21.

The air-conditioning heat-transfer medium circulation channel 91A includes the air-conditioning heat-exchanger 4A that performs heat-exchange with the refrigerant 40 flowing in the refrigerant circulation channel 90 for the refrigeration cycle system, the heat-liberation component 9 mounted in the vehicle, such as an inverter, the indoor heat-exchanger 7B that performs heat-exchange with air blown by an indoor fan 8 into the vehicle interior. The air-conditioning heat-transfer medium 41A is circulated by a circulation pump 5A in the order of the air-conditioning heat-exchanger 4A to the indoor heat-exchanger 7A. The air-conditioning heat-transfer medium 41A that can be used may comprise water or antifreeze liquid, for example.

The air-conditioning heat-transfer medium circulation channel 91A includes the air-conditioning heat-exchanger 4A that performs heat-exchange with the refrigerant 40 flowing in the refrigerant circulation channel 90 for the refrigeration cycle system, the heat-liberation component 9 mounted in the vehicle, such as an inverter, the indoor heat-exchanger 7B that performs heat-exchange with air blown by an indoor fan 8 into the vehicle interior, and the reservoir tank 34. The cooling heat-transfer medium 41B is circulated by a circulation pump 5B in the order of the cooling heat-exchanger 4B, the heat-liberation component 9, the indoor heat-exchanger 7B, and the reservoir tank 34. The cooling heat-transfer medium circulation channel 91B is equipped with a bypass circuit 30 that bypasses a main circuit 31 and the indoor heat-exchanger 7B. The main circuit 31 includes a two-way valve 26 that serves as a flow rate controller. The bypass circuit 30 includes a two-way valve 25 that serves as a flow rate controller. The flow rate of the cooling heat-transfer medium 41B can be controlled between 0% and 100%. The cooling heat-transfer medium 41B that can be used may comprise water or antifreeze liquid, for example.

In the vehicle air-conditioning apparatus according to the first embodiment, the indoor heat-exchanger 7A of the air-conditioning heat-transfer medium circulation channel 91A and the indoor heat-exchanger 7B of the cooling heat-transfer medium circulation channel 91B are disposed in series and in two stages one above another. The heat-transfer medium circulation channels 7A and 7B are disposed along the direction in which air is blown by the indoor fan 8, such that the heat-transfer medium circulation channel 7A is upstream and the heat-transfer medium circulation channel 7A is downstream. The wind, which is blown by the fan 8, first passes through the indoor heat-exchanger 7A and then the indoor heat-exchanger 7B, and finally blasts out into the vehicle interior. Herein, the air that is blown by the indoor fan 8 to pass through the indoor heat-exchangers 7A and 7B and performs heat-exchange with the heat media 41A, 41B is referred to as "vehicle interior-introduced air". There are two types of the vehicle interior-introduced air. In an internal-air-circulation air-conditioning mode, the vehicle interior-introduced air comprises air introduced from the vehicle interior or room whereas in an external-air-introduced air-conditioning mode, the vehicle interior-introduced air comprises air introduced from outside the vehicle interior.

In the cooling heat-transfer medium circulation channel 91B shown in FIG. 1, the circulation channel 91B is constructed such that the cooling heat-transfer medium 41B is flown through the cooling heat-exchanger 4B, the heat-liberation component 9, the indoor heat-exchanger 7B, the reservoir tank 34, the circulation pump 5B, and the cooling heat-exchanger 4B in this order. With this construction, the cooling heat-transfer medium 41B warmed by the heat-liberation component 9 is allowed to liberate heat directly in the indoor heat-exchange 7B and heat liberation occurring in the pipe ranging from the heat-transfer medium heat-liberation component 9 to the indoor heat-exchanger 7B can be decreased. Thereafter, the temperature of the cooling heat-transfer medium 41B is adjusted in the cooling heat-exchanger 4B. In case the cooling heat-transfer medium 41B is flown through the heat-liberation component 9, the cooling heat-exchanger 4B, and the indoor heat-exchanger 7B in this order, heat liberation will take place such that the temperature of the cooling heat-transfer medium 41B is lowered in the cooling heat-exchanger 4B before the heat liberation is performed by the indoor heat-exchanger 7B. This results in a decreased amount of liberated heat.

In this embodiment, an inverter is illustrated as an example of the heat-liberation component 9. However, the heat-liberation component 9 is not limited to the inverter but any of in-vehicle devices or components that liberate heat, such as a converter, a motor, and a battery, may be selected as the heat-liberation component 9 as a target to be cooled. When there are used a plurality of in-vehicle devices or components that liberate heat, such as a battery, an inverter, and a motor, it is preferred that these devices or components are arranged along the direction from upstream to downstream of the flow of the cooling heat-transfer medium 41B in the order of increasing permissible temperature or an increasing thermal time constant of the devices, for example, in the order of the battery, the inverter, and the motor.

Now, an example of an electric circuit of the air-conditioning apparatus according to an embodiment is explained with reference to FIG. 2, in which the same or like parts or components as those shown in FIG. 1 are indicated by the same reference numerals. An in-vehicle temperature setter 61 is an operation member with which the crew sets the temperature of the vehicle interior at any desired temperature. The set temperature becomes a target room temperature. A temperature sensor 62 for outdoor air detects the temperature of air outside the room. A refrigerant temperature sensor for air-conditioning 63 detects the temperature of the refrigerant 40 that flows through a refrigerant inlet/outlet 39 of the air-conditioning heat-exchanger 4A and a refrigerant temperature sensor for cooling 64 detects the temperature of the refrigerant 40 that flows through a refrigerant inlet/outlet 37 of the cooling heat-exchanger 4B. A vehicle speed sensor 65 detects a running speed of the vehicle. A heat-transfer medium temperature sensor for air-conditioning 66 detects the temperature of the air-conditioning heat-transfer medium 41A at the inlet for the heat-transfer medium in the indoor heat-exchanger 7A and a heat-transfer medium temperature sensor for cooling 67 detects the temperature of the cooling heat-transfer medium 41B at the inlet for the heat-transfer medium of the exothermic 9. A control device 60 includes a CPU 60a and a memory 60b and so on and controls drive circuits 20d, 21d, 22Ad, . . . for various devices 20, 21, 22A, . . . shown in FIG. 1, based on input signals from setters and various sensors, thus performing air-conditioning control of the vehicle interior and cooling (or heating) control of devices or components.

In the air-conditioning apparatus according to the first embodiment, it is usually necessary to perform cooling of the heat-liberation component 9, so that the circulation pump 5B in the cooling heat-transfer medium circulation channel 91B is put in action on a steady basis. Operations of other devices vary depending on the load of air-conditioning and amount of heat liberated by the heat-liberation component 9, so that operations of the air-conditioning apparatus according to one embodiment of the present invention will be explained as classified by operation modes such as cooling-dehumidifying, heating-dehumidifying, heating and so on.

Cooling Operation Mode: FIG. 1 illustrates the flow of the refrigerant upon a cooling operation. Referring to FIG. 1, the operation of the vehicle air-conditioning apparatus is explained. In the cooling operation mode, the four-way valve 20 and the three-way valve are switched to a state as shown in solid line in FIG. 1. In this state, the outdoor heat-exchanger 2 is used as a condenser, and both the air-conditioning heat-exchanger 4A and the cooling heat-exchanger 4B are used as evaporators to perform cooling of the vehicle interior by the air-conditioning heat-transfer medium circulation channel 91A or cooling of the heat-liberation component 9 by the cooling heat-transfer medium circulation channel 91B. The two-way valve 25 is opened and the two-way valve 36 is closed and then the cooling heat-transfer medium is circulated through the bypass circuit 30.

The refrigerant compressed by the compressor 1 liberates heat to external air in the outdoor heat-exchanger 2 and is liquefied. The resulting liquid is bifurcated in the receiver tank 24 into one portion of the refrigerant 40 that flows to the air-conditioning heat-exchanger 4A and the other portion of the refrigerant 40 that flows to the cooling heat-exchanger 4B. The portion of the refrigerant 40 that flows to the air-conditioning heat-exchanger 4A is decompressed by the expansion valve 22A to have a low temperature and a low pressure and absorbs heat from the air-conditioning heat-transfer medium 41A in the air-conditioning heat-transfer medium circulation channel 91A at the air-conditioning heat-exchanger 4A to evaporate. The vapor passes through the four-way valve 20 and returns to the compressor 1. On the other hand, the portion of the refrigerant 40 that flows to the cooling heat-exchanger 4B is decompressed by the expansion valve 22B to have a low temperature and a low pressure and adsorbs heat from the cooling heat-transfer medium 41B in the cooling heat-transfer medium circulation channel 91B at the cooling heat-exchanger 4B to evaporate. The vapor passes through the three-way valve 21 and returns to the compressor 1.

For the air-conditioning heat-transfer medium circulation channel 91A, the air-conditioning circulation pump 5A and the indoor fan 8 are activated to feed the air-conditioning heat-transfer medium 41A cooled by the air-conditioning heat-exchanger 4A to the indoor heat-exchanger 7A to cool air that is to be blown by the indoor fan 8 into the vehicle interior. On the other hand, for the cooking heat-transfer medium circulation channel 91B, the cooking circulation pump 5B is activated to feed the cooling heat-transfer medium 41B cooled by the cooling heat-exchanger 4B to the heat-liberation component 9 to cool it. In the cooling operation mode, the two-way valve 25 in the cooling heat-transfer medium circulation channel 91B is fully open whereas the two-way valve 26 in the cooling heat-transfer medium circulation channel 91B is fully closed, so that the cooling heat-transfer medium 41B that has cooled the heat-liberation component 9 is introduced to the reservoir tank 34 through the bypass circuit 30.

As mentioned above, both the heat-exchangers 4A and 4B can be used as evaporators, so that cooling of the vehicle interior and cooling of the heat-liberation component 9 can be performed simultaneously. Further, the heat-exchangers 4A and 4B are connected to between the intake pipe 11 and the receiver tank 24 in parallel and the resulting parallel circuits are provided with the expansion valves 22A and 22B, respectively, so that it is possible to change respective flow rates of the refrigerants that flow through the heat-exchangers 4A and 4B in any desired manner. Therefore, the respective temperatures of the heat-exchangers 4A and 4B can be controlled to any desired temperatures, respectively. Even when the temperature of the air-conditioning heat-transfer medium 41A is decreased sufficiently in order to perform cooling, the cooling heat-transfer medium 41B that flows to the heat-liberation component 9 can be maintained at high temperatures by suppressing the flow rate of the refrigerant that flows to the cooling heat-exchanger 4B.

If the surface temperature of the heat-liberation component 9 is lower than the temperature of the outside air, heat is transferred from the external air into the heat-liberation component 9. The capability of cooling required for the refrigeration cycle system refrigerant circulation channel 90 is increased corresponding to the amount of the heat transferred into the heat-liberation component 9. This causes a decrease in cruising distance. When the temperature of the heat-liberation component is lower than the dew-point temperature of the external air, there is the possibility that dew formation would occur on the surface of the heat-liberation component 9. It is necessary to take countermeasures to cope with the inconveniences attributable to the dew formation. The same is true for the pipe route and it is desirable to maintain the temperature of the cooling heat-transfer medium 41B higher than the temperature of the external air.

Thus, in this embodiment, the target temperature of the cooling heat-transfer medium 41B is set at a temperature higher than the temperature of the external air. As a result, the dew formation on the heat-liberation component 9 can be avoided without fail. The temperature of the cooling heat-transfer medium 41B can be controlled by controlling the opening degree of the expansion valve 22B. For simplicity, the opening degree of the valve can be controlled such that when the temperature of the cooling heat-transfer medium 41B is high, the opening degree of the expansion valve 22B is made large, whereas when the temperature of the cooling heat-transfer medium 41B is low, the opening degree of the expansion valve 22B is made small.

However, if the expansion valve 22B is controlled taking into consideration only the temperature change of the cooling heat-transfer medium 41B, there is the possibility that the opening degree would be too large to evaporate the refrigerant and liquid refrigerant would enter the compressor 1. In this embodiment, the opening degree of the expansion valve 22B is controlled such that the temperature of the refrigerant that flows out from refrigerant inlet/outlet 37 of the cooling heat-exchanger 4B reaches a desired temperature upon cooling operation of the heat-liberation component. A decreased target value of the refrigerant temperature at the refrigerant inlet/outlet 37 leads to an enhanced capacity of cooling because of an increase in the flow rate of the refrigerant. On the contrary, an increased target value of the refrigerant temperature at the refrigerant inlet/outlet 37 leads to a decreased flow rate of the refrigerant, resulting in a decreased capacity of cooling, so that the temperature of the cooling heat-transfer medium 41B increases. By controlling such that the temperature of the refrigerant at the refrigerant inlet/outlet 37 of the cooling heat-exchanger 4B will be the target temperature, the temperature of the cooling heat-transfer medium 41B can be controlled to any desired temperature.

By setting the target value of temperature of the refrigerant that flows out from the refrigerant inlet/output 37 of the cooling heat-exchanger 4B to a value higher than the target value of temperature of the refrigerant that flows out from the refrigerant inlet/outlet 39 of the air-conditioning heat-exchanger 4A upon cooling operation of the heat-liberation component, the temperature of the cooling heat-transfer medium 41B can be maintained at a level higher than the temperature of the air-conditioning heat-transfer medium 41A.

The cooling capacity of the refrigerant cycle refrigerant circulation channel 90 can be adjusted by controlling the rotation speed of the compressor 1. The rotation speed of the compressor 1 is controlled such that the temperature of the air-conditioning heat-transfer medium 41A is the same as the desired temperature. In case the load of cooling is considered to be high, the target temperature of the air-conditioning heat-transfer medium 41A to be controlled is decreased. On the contrary, when the load of cooling is considered low, the target temperature of the air-conditioning heat-transfer medium 41A to be controlled is elevated. In this manner, it is possible to control air-conditioning capacity depending on the load of cooling.

In case there is no load of cooling and only cooling of the heat-liberation component 9 is needed, it is sufficient to use only the cooling heat-exchanger 4B as an evaporator by disabling the circulation pump 5A and the indoor fan 8, closing the expansion valve 22A, and adjusting the opening degree of the expansion valve 22B. This allows cooling of the cooling heat-transfer medium 41B, so that the heat-liberation component 9 can be cooled. In this occasion, the rotation speed of the compressor 1 is controlled such that the temperature of the cooling heat-transfer medium 41B will be a target temperature. The target temperature is set at a temperature higher than the temperature of the external air. Alternatively, the amount of exchanged heat may be changed by controlling the rotation speed of the circulation pump 5B.

When the compressor 1 of the refrigeration cycle system refrigerant circulation channel 90 is to be activated, it is desirable that first the circulation pump 5A of the air-conditioning heat-transfer medium circulation channel 91A and the circulation pump 5B of the cooling heat-transfer medium circulation channel 91B are activated and then after a predetermined time the compressor 1 is activated. When the compressor 1 is activated, the refrigerant portions in the heat-exchangers 4A and 4B connected to the intake pipe 11 tend to have lower temperatures. It is possible that the temperatures of the portions of the refrigerant will temporarily be decreased to a temperature lower than the condensation temperature of the heat media 41A and 41B. When the circulation pumps 5A and 5B are not operated, the temperature of the cooling heat-transfer medium 41B and or 41B is decreased, resulting in condensation of the heat-transfer medium. It is possible that this in turn will cause inconveniences such as clogging or breach of the channels in the heat-exchangers 4A and 4B. By activating the circulation pumps 5A and 5B before the compressor 1 can be activated, such inconveniences due to the condensation of the heat media 41A and 41B can be avoided.

Cooling-Dehumidifying Operation Mode: Now, operation of a cooling-dehumidifying operation mode of the air-conditioning apparatus according to one embodiment of the present invention is explained. When the apparatus is to be operated in the cooling-dehumidifying operation mode, the flow of refrigerant upon cooling operation shown in FIG. 1 is modified by closing the two-way valve 25 and opening the two-way valve 26 to allow the cooling heat-transfer medium 41B to circulate through the in-door heat-exchanger 7B in the main circuit 31. In the cooling-dehumidifying operation mode, the two-way valve 26 is open so that the cooling heat-transfer medium 41B that has a temperature higher than that of the air-conditioning heat-transfer medium 41A can be introduced into the indoor heat-exchanger 7B. As a result, the apparatus is allowed to perform so-called reheat cooling-dehumidifying, in which air that has been cooled and dehumidified by the indoor heat-exchanger 7A is heated by the indoor heat-exchanger 7B before it can be blown out into the vehicle interior. In this case, the air fed to the vehicle interior has a lower relative humidity than before the heating, so that people in the vehicle interior space can feel more comfort. The indoor heat-exchanger 7 employed as a reheater uses so-called waste heat liberated by the heat-liberation component 9 as a heat source. Unlike the case where a heater or the like is used for reheating, it is unnecessary for the apparatus according to this embodiment to input energy freshly for reheating, so that comfort of the vehicle interior can be increased without increasing the consumption of power.

The amount of reheat is changed depending on the temperature and flow rate of the cooling heat-transfer medium 41B that flows through the main circuit 31. The amount of reheat can be controlled by changing the amount of exchanged heat of the cooling heat-exchanger 4B and/or the flow rate of the cooling heat-transfer medium 41B that flows through the main circuit 31. The amount of exchanged heat of the cooling heat-exchanger 4B can be changed by controlling the opening degree of the expansion valve 22B to adjust the flow rate of the refrigerant that flows toward the cooling heat-exchanger 4B. If cooling is unnecessary, the expansion valve 22B is fully closed. The flow rate of the cooling heat-transfer medium 41B that flows into the main circuit 31 can be changed by adjusting the opening degrees of the two-way valves 25 and 26.

In the first embodiment, explanation has been made of examples in which the main circuit 31 and the bypass circuit 30 are provided with the two-way valves 25 and 26, respectively, in order to adjust proportion of the flow rates of the portions of heat-transfer medium 41B that flow toward the respective circuits 31 and 30. However, the proportion of flow rates of the portions of the cooling heat-transfer medium 41B that flow through the main circuit 31 and the bypass circuit 30 can be adjusted by using a three-way valve, for example.

Figure 3:
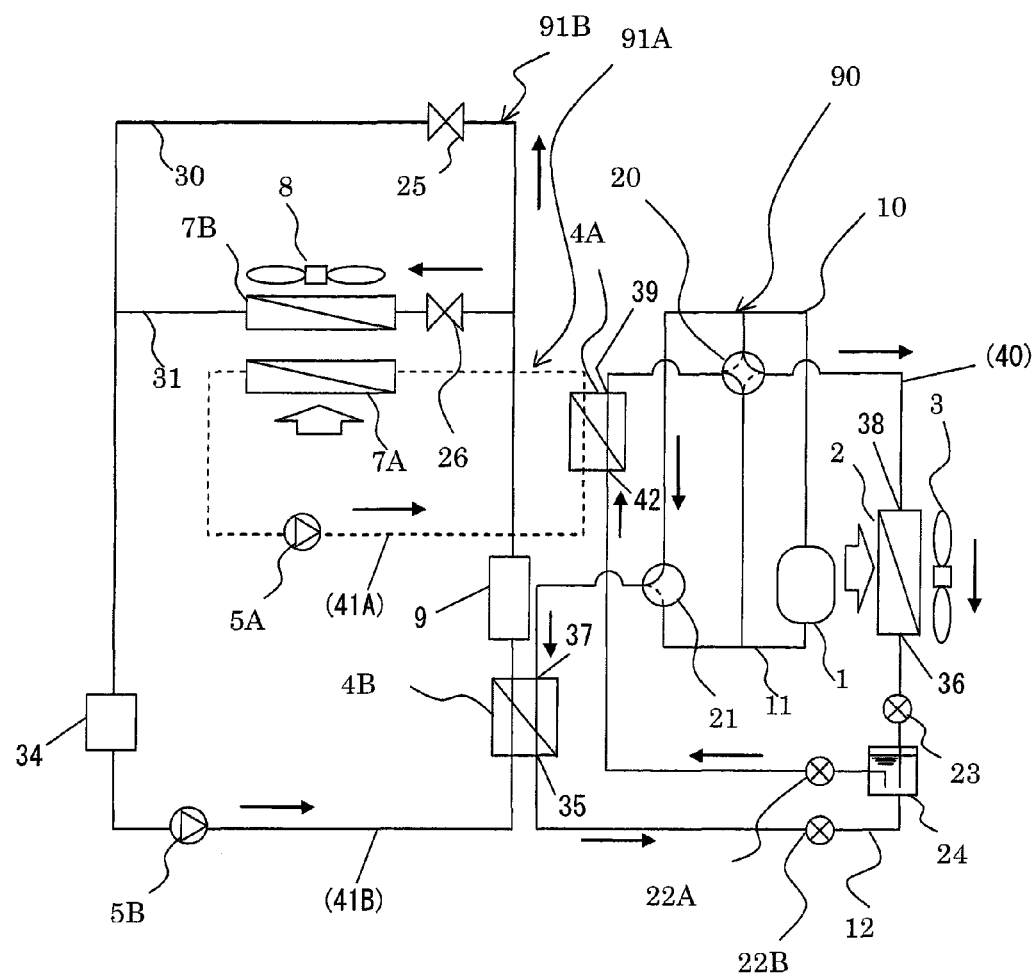
FIG. 3 presents a schematic diagram showing a construction of a vehicle air-conditioning apparatus according to the first embodiment of the present invention, illustrating the flow of the refrigerant upon a heating operation.

Heating-Dehumidifying Operation Mode: Now, operation of the air-conditioning apparatus in a heating-dehumidifying operation mode according to the first embodiment is explained. FIG. 3 illustrates the flow of the refrigerant when the air-conditioning apparatus is operated in a heating-dehumidifying operation mode. In case the amount of reheat is insufficient, the heating-dehumidifying operation is performed by switching the three-way valve 21 as shown in solid line in FIG. 3. In the heating-dehumidifying operation, the air-conditioning heat-exchanger 4A remains to serve as an evaporator while the cooling heat-exchanger 4B is used as a condenser and heats the cooling heat-transfer medium 41B. In this case, the refrigerant 40 compressed by the compressor 1 is divided and led by the four-way valve 20 and the three-way valve to the outdoor heat-exchanger 2 and the cooling heat-exchanger 4B where the portions of the refrigerant are condensed and liquefied. Then, the obtained liquids are combined in the receiver tank 24. Thereafter, the refrigerant, whose pressure is reduced through the expansion valve 22A, is evaporated/gasified in the air-conditioning heat-exchanger 4A and returned to the compressor 1. In this way, the heat medium 41B can be heated by using the cooling heat-exchanger 4B, so that even when the amount of reheat is insufficient, the amount of reheat can be increased by using the refrigerant cycle refrigerant circulation channel 90.

The heat input from the cooling heat-exchanger 4B is a portion of the heat discharged to the outdoor air and the amount of reheat can be increased without using new heat sources. In other words, there is no increase in power consumption. Since the refrigerant discharged from the compressor 1 is condensed by both the cooling heat-exchanger 4B and the outdoor heat-exchanger 2, the amount of reheat can be changed to any desired value by controlling the amounts of the portions of the refrigerant that flow therein, respectively. More particularly, when the rotation speed of the outdoor fan 3 is decreased, the amount of heat discharged from the outdoor heat-exchanger 2 is suppressed and also the flow rate of the refrigerant is suppressed. In addition, the flow rate of the refrigerant can be controlled by decreasing the opening degree of the expansion valve 23, so that it is possible to increase the amount of heat-exchange through the cooling heat-exchanger 4B and also increase the amount of reheat. In case the external air has a low temperature or under the condition under which the air of wind generated upon running is applied to the outdoor heat-exchanger 2 to increase heat-exchange capacity, the amount of discharged heat from the outdoor heat-exchanger 2 tends to be increased. Therefore, the amount of reheat can be increased by decreasing the rotation speed of the outdoor fan 3 or decreasing the opening degree of the expansion valve 23 utilizing the sensor information such as outdoor temperature or vehicle speed.

As mentioned above, the air-conditioning apparatus according to the first embodiment is configured to control the amount of dehumidification and the amount of reheat. More particularly, the temperature of the air-conditioning heat-transfer medium 41A is changed to a temperature at which dehumidification is possible by controlling the rotation speed of the compressor 1 in order to secure a desired dehumidification amount. On the other hand, the flow rate of the refrigerant that flows through the cooling heat-exchanger 4B by controlling the rotation speed of the outdoor fan 3 and the opening degree of the expansion valves 23 and 22B in order to maintain the temperature of the cooling heat-transfer medium 41B at a suitable temperature to secure the amount of reheat. Also, it is possible to perform heating operation in which the temperature of air blown into the vehicle interior is higher than the temperature of air incorporated by increasing the amount of reheat and maintaining the temperature of the cooling heat-transfer medium 41B at high temperatures. This is particularly advantageous under conditions under which the external air is at low temperature and low humidity. Note that it is difficult to detect the amount of reheat correctly with an actual apparatus. Accordingly, the temperature of the cooling heat-transfer medium 41B and the flow rate of the cooling heat-transfer medium 41B into the main circuit 31 are changed and the amount of reheat is controlled such that the air blown into the vehicle interior has a desired temperature.

Figure 4:
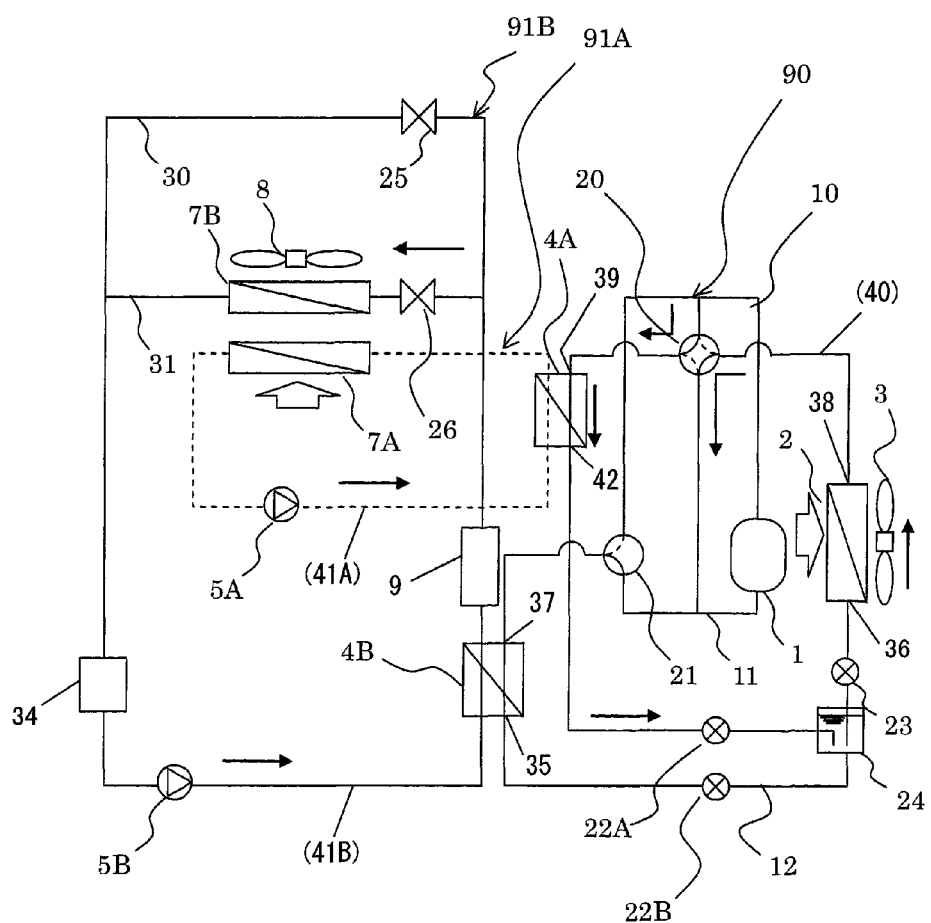
FIG. 4 presents a schematic diagram showing a construction of a vehicle air-conditioning apparatus according to the first embodiment of the present invention, illustrating the flow of the refrigerant upon a heating operation.

Heat-liberating Operation Mode: Operation of the air-conditioning apparatus according to the first embodiment of the present invention is explained. FIG. 4 illustrates the flow of the refrigerant upon heating operation. Upon the heating operation, the four-way valve 20 and the three-way valve 21 are switched as shown in solid like in FIG. 4. In the heating operation under a low load, the compressor 1 is disabled and the refrigeration cycle system refrigerant circulation channel 90 is not used and there is performed heat-liberating operation in which waste heat from the heat-liberation component 9 is used for heating. In the heat-liberating operation mode, the circulation pump 5B and the indoor fan 8 are activated and the two-way valve 26 is opened to allow the cooling heat-transfer medium 41B to enter the heat-exchanger 7B. Since the cooling heat-transfer medium 41B is heated by the heat-liberation component 9, the cooling heat-transfer medium 41B liberates heat to the air to be blown into the vehicle interior and hence is cooled. As mentioned above, waste heat from the heat-liberation component 9 can be used for heating, so that an air-conditioning apparatus requiring minimized energy consumption can be realized according to this embodiment.

Heating-Heat-liberating Operation Mode: In case the amount of heat liberated by the heat-liberation component 9 is insufficient to cover the load of heating, there is performed a heating-heat-liberating combined operation in which the refrigeration cycle system refrigerant circulation channel 90 is used in combination. The four-way valve 20 and the three-way valve 21 are switched in the same manner as the heat-liberating operation as shown in solid line in FIG. 4 to constitute a cycle in which the air-conditioning heat-exchanger 4A serves as a condenser and the outdoor heat-exchanger 2 serves as an evaporator in the refrigeration cycle system refrigerant circulation channel 90. At the same time, the expansion valve 22A is fully opened and the expansion valve 22B is fully closed, with the cooling heat-exchanger 4B being not used. The refrigerant 40 compressed by the compressor 1 liberates heat to the air-conditioning heat-transfer medium 41A in the air-conditioning heat-exchanger 4A and thereby is condensed and liquefied. The liquefied refrigerant is passed through the expansion valve 23 to reduce pressure and then fed to the outdoor heat-exchanger 2, in which the refrigerant exchange heat with the outside air and thereby is evaporated and gasified, and then returned to the compressor 1.

By activating the circulation pump 5A, the air-conditioning heat-transfer medium 41A whose temperature has been elevated due to condensation heat of the refrigerant 40 transferred in the air-conditioning heat-exchanger 4A is passed to the indoor heat-exchanger 7A, so that the air-conditioning heat-transfer medium 41A liberates heat to the air to be blown into the vehicle interior for performing heating. The air heated by the indoor heat-exchanger 7A is fed to the indoor heat-exchanger 7B disposed downstream side of the air flow and receives heat from the cooling heat-transfer medium 41B heated by the heat-liberation component 9 to have an elevated temperature before it is blown out into the vehicle interior space. As mentioned above, the air-conditioning apparatus according to this embodiment is configured such that the air to be blown into the vehicle interior is heated in the refrigeration cycle system refrigerant circulation channel 90 and then further heated with waste heat from the heat-liberation component 9. Accordingly, the temperature of air to be blown into the vehicle interior from the indoor heat-exchanger 7A can be maintained at a temperature lower than the temperature of air to be blown out into the vehicle interior from the indoor heat-exchanger 7B.

According to the first embodiment, an example of the air-conditioning apparatus in which the indoor heat-exchangers 7A and 7B are arranged in series has been explained above. However, when the indoor heat-exchangers 7A and 7B are arranged in parallel, the heating the load to the heating capability of the refrigeration cycle system refrigerant circulation channel 90 can be decreased by the amount corresponding to the heat generated by the heat-liberation component 9 and the proportion of the power consumption decreased is approximately equal to the decreased proportion of the load to the heating capability. This is because the evaporation temperature and the condensation temperature of the refrigerant do not change considerably. Likewise, in case where the cooling heat-transfer medium 41B is heated by the heat-liberation component 9 and the refrigerant cycle refrigerant circulation channel 90 by using the cooling heat-exchanger 4B, the power consumption can be decreased by an amount corresponding to the amount of decreased heating capability.

In the configuration of the air-conditioning apparatus according to the first embodiment, the indoor heat-exchanger 7A is heated in the refrigeration cycle system refrigerant circulation channel 90 by using the air-conditioning heat-exchanger 4A without using the cooling heat-exchanger 4B. This is connected in series to the heating means that uses waste heat from the heat-liberation component 9. As a result, an outlet air temperature of the indoor heat-exchanger 7A arranged upstream side of the air flow can be made lower than an outlet air temperature of the case where the heat-exchangers 7A and 7B are arranged in parallel. That is, the temperature of air that exchanges heat in the indoor heat-exchanger 7A can be made lower than the case where the indoor heat-exchangers 7A and 7B are arranged in parallel, so that the condensation temperature can be suppressed to low levels and the power consumption in the refrigeration cycle system refrigerant circulation channel 90 can be decreased accordingly. Therefore, the power consumption can be suppressed more than the decreased proportion of the heating capability and an air-conditioning apparatus that consumes less power can be provided.

If the three-way valve 21 is switched to the circuit shown in broken line in FIG. 4 and the cooling heat-exchanger 4B is used as a condenser, the condensation temperature must be set at a temperature at which heat-exchange with the cooling heat-transfer medium 41B which has a temperature higher than the air-conditioning heat-transfer medium 41A, so that it is impossible to suppress the condensation temperature at low levels. For this reason, even when the three-way valve 21 is in the circuit shown in broken line, the expansion valve 22B is fully closed to prevent the refrigerant from flowing into the cooling heat-exchanger 4B.

According to the first embodiment, the air-conditioning apparatus is configured such that the temperature of the cooling heat-transfer medium 41B is controlled to be a predetermined temperature in order to control the heating capability of the refrigerant cycle refrigerant circulation channel 90. As a result, even when the amount of heat generated by the heat-liberation component 9 varies, the capability of the refrigeration cycle system refrigerant circulation channel 90 can be controlled. That is, when the amount of heat generated by the heat-liberation component 9 is increased, the temperature of the cooling heat-transfer medium 41B is elevated, so that the heating capability of the refrigerant cycle refrigerant circulation channel 90 is suppressed. As a result, the amount of heat discharged from the heat-exchanger 7A is decreased and the temperature of air that flows into the indoor heat-exchanger 7B is decreased, so that the amount of heat discharged from the cooling heat-transfer medium 41B is increased and the elevation of the temperature of the cooling heat-transfer medium 41B is suppressed. On the contrary when the amount of heat generated by the heat-liberation component 9 is decreased, the temperature of the cooling heat-transfer medium 41B is decreased, so that the heating capability of the refrigerant cycle refrigerant circulation channel 90 is increased to elevate the temperature of air that flows into the indoor heat-exchanger 7B, thereby preventing the temperature of the cooling heat-transfer medium 41B from being decreased.

As mentioned above, by controlling the temperature of the cooling heat-transfer medium 41B to a predetermined temperature, it is possible to control the capability of the refrigerant cycle refrigerant circulation channel 90 corresponding to variation of the amount of heat generated by the heat-liberation component 9. As a result, it is possible to not only suppress variation of the temperature of air to be blown into the vehicle interior but also prevent the power consumption caused by excess heating from increasing, so that more energy can be saved. Specifically, the capability of the refrigeration cycle system refrigerant circulation channel 90 may be controlled, for example, by controlling the rotation speed of the compressor 1. It is effective to control the temperature of the cooling heat-transfer medium 41B to a predetermined temperature range in order to avoid inconveniences that are caused, for example, by the fact that the temperature of the heat-liberation component 9 is outside the temperature range that can be used.

According to the first embodiment, the air-conditioning apparatus is configured such that the target temperature of the cooling heat-transfer medium 41B is set high when the load of heating is high, where as it is set low when the load of heating is low. As a result, the temperature of air blown into the vehicle interior space is changed, so that the capability of heating can be controlled.

When the heating operation is started, the temperature of the air-conditioning heat-transfer medium 41A that flows through the air-conditioning heat-exchanger 4A as a condenser is low because it is on the same level as that of the external air, so that there occurs a problem that the condensation pressure of the refrigeration cycle system refrigerant circulation channel 90 is decreased and hence a difference in pressure in the compressor 1 cannot be secured. To overcome the problem, it may be configured such that when the heating operation is started, the indoor fan 8 is inactivated until the temperature of the air-conditioning heat-transfer medium 41A is sufficiently elevated, or the flow rate of the air-conditioning heat-transfer medium 41A in the heat-transfer medium circulation channel 91 is suppressed. As a result, discharge of heat into the vehicle interior can be suppressed to promote elevation of the temperature of the air-conditioning heat-transfer medium 41A.

Figure 5:
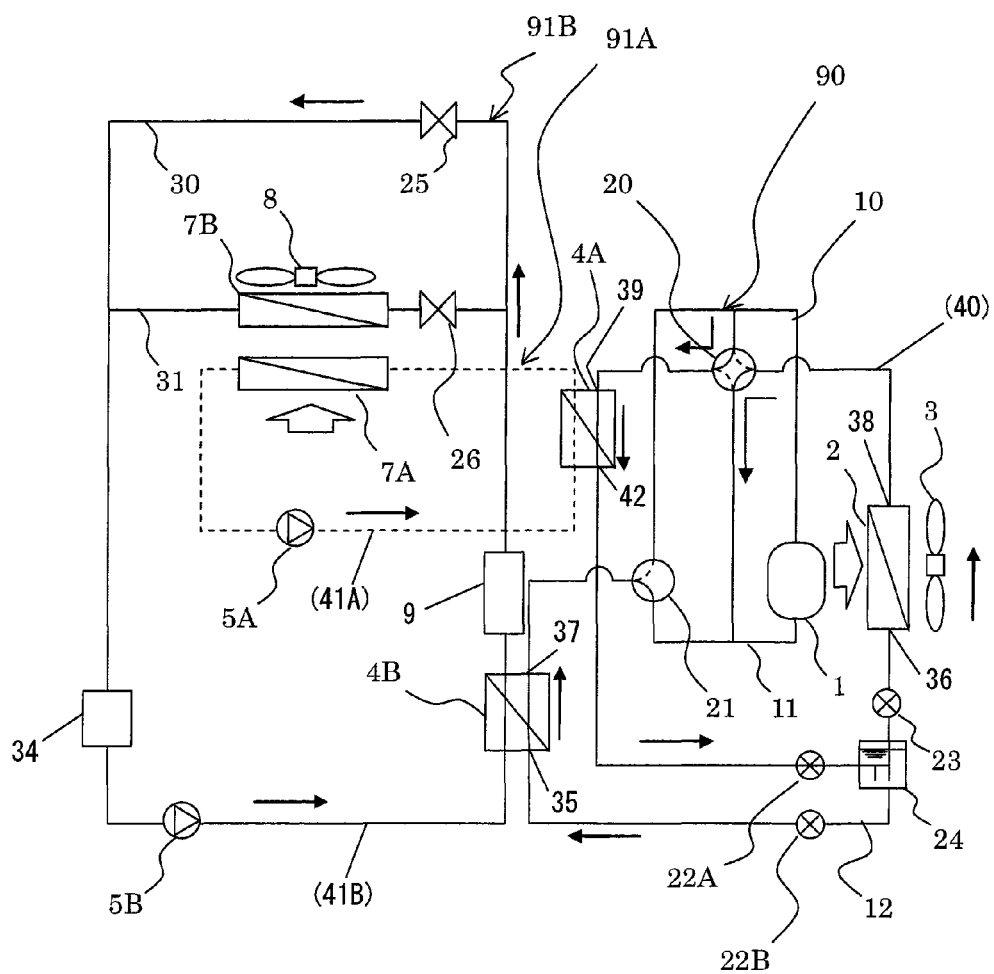
FIG. 5 presents a schematic diagram showing a construction of a vehicle air-conditioning apparatus according to the first embodiment of the present invention, illustrating the flow of the refrigerant upon a heating-cooling operation for heating the vehicle interior and cooling the heat-liberation component.

Indoor Heating-Heat-liberation component Cooling Operation Mode: The operation of the air-conditioning apparatus according to the first embodiment when the load of heating has been increased is explained. When the load of heating is heavy, the target temperature of the cooling heat-transfer medium 41B may be set high as mentioned above. However, when it is difficult to increase the temperature due to the specification or the like of the heat-liberation component 9, it will be impossible to increase the capability of heating. In this case, an indoor heating-heat-liberation component cooling operation is performed in order to perform the cooling of the cooling heat-transfer medium 41B and the cooling of the air-conditioning heat-transfer medium 41A simultaneously. FIG. 5 illustrates the flow of the refrigerant upon indoor heating-heat-liberation component cooling operation. The operation of the air-conditioning apparatus according to this embodiment in the refrigerant upon indoor heating-heat-liberation component cooling operation mode is explained with reference to FIG. 5.

In the refrigerant upon indoor heating-heat-liberation component cooling operation mode, the four-way valve 20 and the three-way valve 21 are switched in the same manner as in the heating heat-liberating operation as shown in FIG. 4 to constitute a cycle system in which the air-conditioning heat-exchanger 4A is used as a condenser and the indoor heat-exchanger 2 is used as an evaporator. In addition, in the refrigerant upon indoor heating-heat-liberation component cooling operation mode, the expansion valve 22B is opened to allow the cooling heat-exchanger 4B to be used as an evaporator. The refrigerant, which is condensed and liquefied in the air-conditioning heat-exchanger 4A is branched in the receiver tank 24. One portion of the refrigerant is depressurized with the expansion valve 23 and then evaporated in the outdoor heat-exchanger 2 before it is returned to the compressor 1. The other portion of the refrigerant is depressurized with the expansion valve 22B and fed to the cooling heat-exchanger 4B where the refrigerant cools the cooling heat-transfer medium 41B, so that it is evaporated/gasified, and is returned to the compressor 1 through the three-way valve 21.

In this cycle, the waste heat from the heat-liberation component 9 is recovered by the cooling heat-exchanger 4B as heat source for the refrigeration cycle system refrigerant circulation channel 90. The recovered heat is transferred from the air-conditioning heat-exchanger 4A to the air-conditioning heat-transfer medium circulation channel 91A and discharged into the vehicle interior from the indoor heat-exchanger 7A. In this manner, it is possible to recover the waste heat from the heat-liberation component 9 and use it for heating while suppressing the temperature of the heat-liberation component 9. In addition, it is also possible to absorb heat from the external air by using the outdoor heat-exchanger 2, so that the capability of heating can be increased.

According to the first embodiment, the expansion valve 23 is arranged between the liquid pipe 12 and the outdoor heat-exchanger 2. As a result, the amount of heat absorbed from heat-transfer medium 41B and the amount of heat absorbed from the external air can be separately controlled by separately controlling the respective opening degrees of the expansion valves 22B and 23.

When the temperature of the cooling heat-transfer medium 41B is lower than the temperature of the air-conditioning heat-transfer medium 41A, the air heated by the indoor heat-exchanger 7A will be cooled by the indoor heat-exchanger 7B. In this case, the two-way valve 26 in the cooling heat-transfer medium circulation channel 91B is closed whereas the two-way valve 25 is opened so that the cooling heat-transfer medium 41B can pass through the bypass circuit 30 to prevent the air to be blown into the vehicle interior space from being cooled by the cooling heat-transfer medium 41B cooled by the cooling heat-exchanger 4B. However, if the temperature of the air to be blown into the vehicle interior space is lower than the temperature of the cooling heat-transfer medium 41B, occur liberation of heat into the vehicle interior space can occur. Accordingly, the two-way valve 25 is closed and the two-way valve 26 is opened to allow the cooling heat-transfer medium 41B to pass through the main circuit 31 to the indoor heat-exchanger and discharge heat to the air to be blown.

In case the load of heating is decreased during the indoor heating-heat-liberation component cooling operation and it becomes necessary to change the operation mode to the heating heat-discharging operation combined mode, it is desirable to elevate the cooling heat-transfer medium 41B before change the operation mode. This is because if the temperature of the cooling heat-transfer medium 41B is low, there is the possibility that an inconvenience such as a decrease in the temperature of the air blown occurs. The temperature of the cooling heat-transfer medium 41B can be controlled by changing the amount of heat-exchanged by the cooling heat-exchanger 4B and hence the temperature of the cooling heat-transfer medium 41B can be controlled by adjusting the opening degree of the expansion valve 22B. When the temperature of the cooling heat-transfer medium 41B is maintained high during the indoor heating heat-liberation component cooling operation and it is detected that the temperature of the air-conditioning heat-transfer medium 41A is lower than the temperature of the cooling heat-transfer medium 41B, it can be judged that the load of heating is decreased, so that the indoor heating-heat-liberation component cooling operation is transitioned to the heating heat-discharging operation combined mode.

Heat-liberation component Heating Operation Mode: At the time of starting the operation of the air-conditioning apparatus in winter when the external temperature has a low temperature, the temperature of the cooling heat-transfer medium 41B is low and it cannot afford heating immediately after the start of the operation so that it is necessary to wait until the temperature of the cooling heat-transfer medium 41B is increased due to waste heat from the heat-liberation component 9. In this case, in the cycle shown in FIG. 5, the expansion valve 22B is closed and heat operation is performed using the indoor heat-exchanger 7A. In addition, the cycle is configured such that the two-way valve 26 will not be opened in order to prevent the cooling heat-transfer medium 41B at a low temperature from performing heat-exchange with the air to be blown into the vehicle interior in the indoor heat-exchanger 7B.

Figure 6:
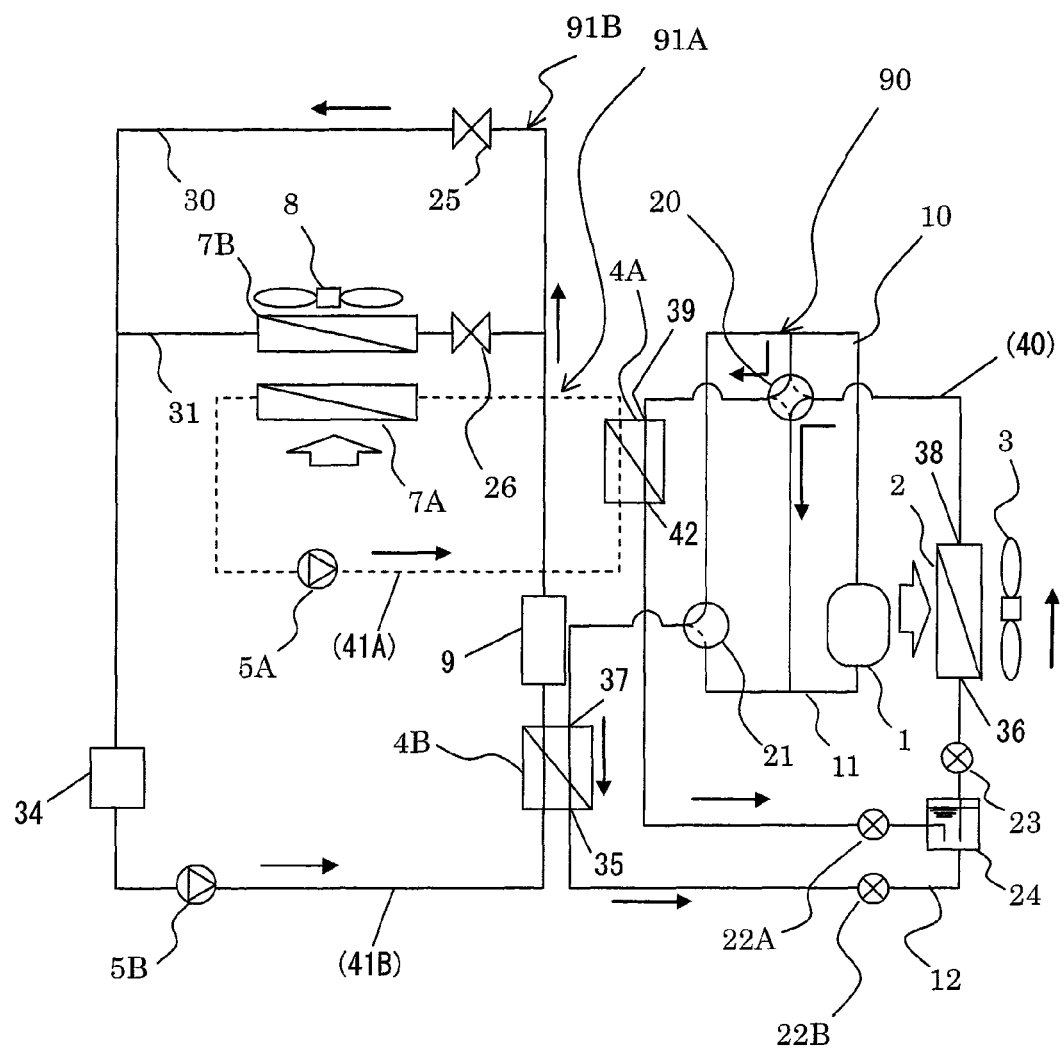
FIG. 6 presents a schematic diagram showing a construction of a vehicle air-conditioning apparatus according to the first embodiment of the present invention, illustrating the flow of the refrigerant upon a heating operation for heating the heat-liberation component.

In case where the heat-liberation component 9 generates heat in small amounts and it is desired to increase the temperature of the cooling heat-transfer medium 41B in an earlier stage, the three-way valve 21 is switched as shown in solid line in FIG. 6. With this configuration, the refrigerant 40 discharged from the compressor 1 flows through both the air-conditioning heat-exchanger 4A and the cooling heat-exchanger 4B, so that it is possible to heat the cooling heat-transfer medium 41B by using condensation heat of the portion of the refrigerant 40 that flows into the cooling heat-exchanger 4B. In this cycle, both the expansion valves 22A and 22B and the opening degree of the expansion valve 23 is controlled appropriately to depressurize the refrigerant 40. Then, heat is absorbed from the external air in the outdoor heat-exchanger 2. Further, the two-way valve 26 is closed while the two-way valve 25 is opened and then the cooling heat-transfer medium 41B is flown through the bypass circuit 30.

In this manner, the cooling heat-transfer medium 41B can be heated by using the refrigeration cycle system refrigerant circulation channel 90, so that there can be performed the heat-liberation component heating operation in which the temperature of the heat-liberation component 9 is elevated to a predetermined temperature in an early stage. On this occasion, the flow rate of the circulation pump 5B may be suppressed or the circulation pump 5B may be inactivated. By so doing, the amount of heat-exchanged with the cooling heat-transfer medium 41B can be suppressed and the temperature of the heat-liberation component 9 can be increased in an earlier stage.

Figure 7:
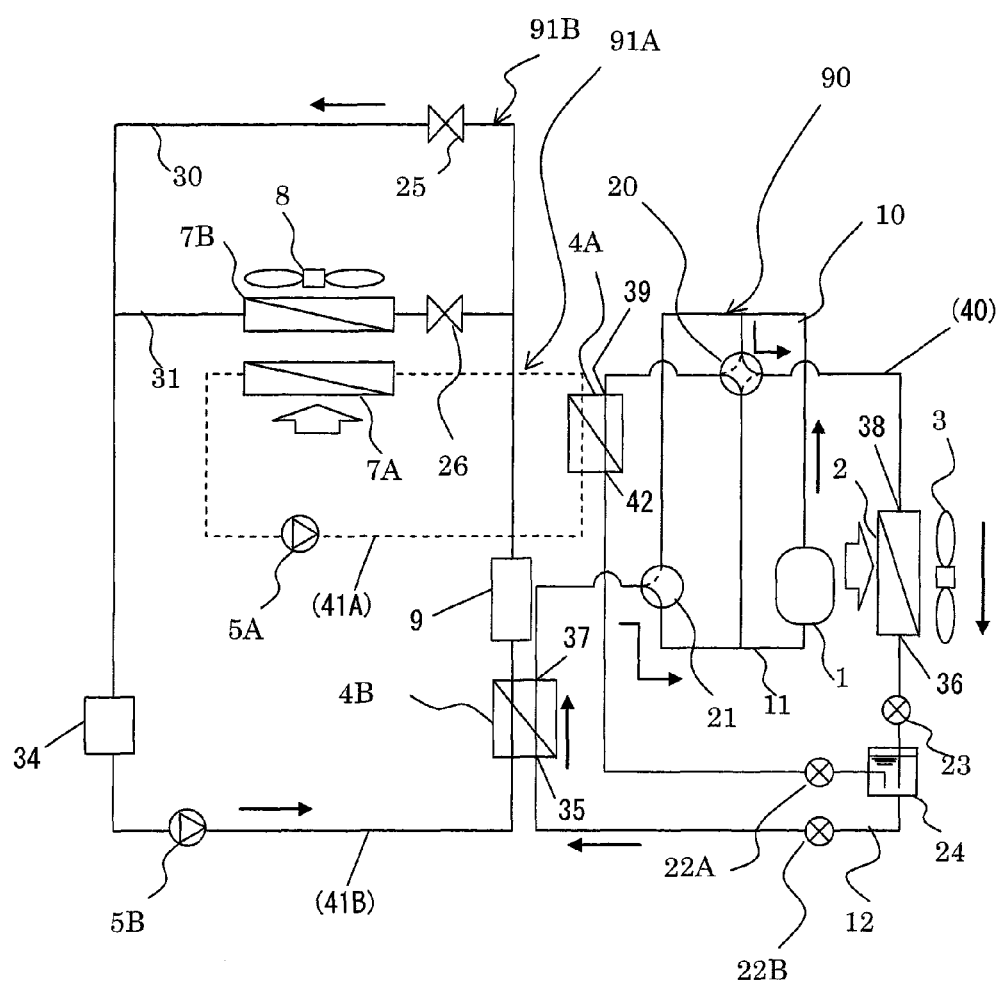
FIG. 7 presents a schematic diagram showing a construction of a vehicle air-conditioning apparatus according to the first embodiment of the present invention, illustrating the flow of the refrigerant upon a defrosting operation.

Defrosting: When the operation of the air-conditioning apparatus in which the outdoor heat-exchanger 2 is used as an evaporator is continued, frost may grow on the surface of the heat-exchanger and it is necessary to perform a defrosting operation that melts frost. Upon the defrosting operation, the four-way valve 20 and the three-way valve 21 are switched as shown in solid line in FIG. 7 and the expansion valve 22A is fully closed to constitute a cycle in which the outdoor heat-exchanger 2 is used as a condenser and the cooling heat-exchanger 4B is used as an evaporator. On the other hand, the two-way valve 26 is closed to shut off the flow of the cooling heat-transfer medium 41B to the main circuit 31 and allow the cooling heat-transfer medium 41B to flow toward the bypass circuit 30.

When the air-conditioning heat-exchanger 4A is used as an evaporator, the temperature of the air to be blown into the vehicle interior tends to be decreased. In the first embodiment, the waste heat from the heat-liberation component 9 is used as a heat source to prevent the temperature of the vehicle interior space being decreased. When the heat of the air to be blown into the vehicle interior space is used as a heat source, it may be possible that the amount of heat will be insufficient and defrosting time will be prolonged. However, since the heat-liberation component 9 is connected and further the cooling heat-transfer medium 41B that is maintained at a high temperature can be used as a heat source for defrosting. As a result, the heat source for defrosting can be secured and the time of defrosting can be shortened. During the defrosting operation, the decrease in the temperature of the air to be blown out can be suppressed by suppressing the amount of wind generated by the indoor fan 8 or stopping the operation of the indoor fan 8.

As mentioned above, according to the first embodiment, there can be provided a vehicle air-conditioning apparatus, in which control of the temperature of air-conditioning and control of the temperature of apparatus can be realized simultaneously by using one refrigeration cycle system refrigerant circulation channel 90 and which minimized power consumption.

If vehicle-induced turbulence is applied to the outdoor heat-exchanger 2 upon the defrosting operation in which frost attached on the heat-exchanger 2 is molten, it becomes difficult for the outdoor heat-exchanger 2 to increase its temperature, so that capability of defrosting is decreased. Accordingly, the outdoor 3 is rotated inversely to suppress the vehicle induced turbulence or natural ventilation. On this occasion, the amount of air that passes through the outdoor heat-exchanger 2 can be suppressed to a minimum level if the vehicle speed is varied by increasing the more the inverse rotation speed of the outdoor fan 3 the higher the vehicle speed is. Needless to say, when the vehicle is parked, the outdoor fan 3 is inactivated. It is also possible to configure the apparatus such that a shutter that is openable and closable is provided on the side of the outdoor heat-exchanger 2 where the natural ventilation is applied and upon performing defrosting, the outdoor fan 3 is inactivated and at the same time the shutter is closed to shut off the natural ventilation or vehicle induced turbulence that passes through the outdoor heat-exchanger 2.

Receiver Tank: According to the first embodiment, the air-conditioning apparatus is configured to include three heat-exchangers, i.e., the outdoor heat-exchanger 2, the air-conditioning heat-exchanger 4A and the cooling heat-exchanger 4B to constitute the refrigeration cycle system refrigerant circulation channel 90 that is adapted to operate corresponding to various modes by appropriately switching combinations of the condensers and evaporators. An appropriate amount of the refrigerant 40 in each cycle may vary depending on the number and/or internal volume of heat-exchangers serving as evaporators and there may occur excessive refrigerant depending on conditions, so that there may be the possibility that condensation pressure will be increased. Therefore, this embodiment is configured such that the liquid pipes 12 connected to the three heat-exchangers are combined in the receiver tank 24. If the receiver tank was equipped to a pipe in which the refrigerant does not flow, the function of adjusting the amount of the refrigerant does not work well, resulting in an inconvenience such as stagnation of the refrigerant. On the contrary, according to this embodiment, the receiver tank 24 is arranged at a junction of the liquid pipes 12 connected to the three heat-exchangers so that even where there is a heat-exchanger that is halted in operation. The other heat-exchanger or exchangers out of the heat-exchangers connected to the receiver tank 24 are always operated and the refrigerant 40 flows inside the other heat-exchanger or exchangers. As a result, the effect of adjusting the amount of the refrigerant can be accomplished without fail in any of the operation modes.

Thermosiphon: According to the first embodiment, a cycle is constituted by a thermosiphon when the temperature of the cooling heat-transfer medium 41B is higher than the temperature of the outdoor air and the heat-liberation component 9 can be cooled without starting up the compressor 1. The operation of the system in this case is explained with reference to FIGS. 8 and 9.

In the cooling operation by thermosiphon, the cooling heat-transfer medium 41B heats the refrigerant 40 to evaporate it in the cooling heat-exchanger 4B. The evaporated gaseous refrigerant is flown into the outdoor heat-exchanger 2, where the gaseous refrigerant exchanges heat with outside air at a lower temperature than the refrigerant and is condensed and liquefied. The liquefied refrigerant again flows into the cooling heat-exchanger 4B through the liquid pipe by self-weight of the refrigerant. In this way, the cooling operation by thermosiphon takes advantage of self-weight of the refrigerant or gravity. Therefore, the system is configured such that the liquid refrigerant obtained by condensation in the outdoor heat-exchanger 2 can flow into the cooling heat-exchanger 4B by gravity. That is, an outlet/inlet 35 for the refrigerant of the cooling heat-exchanger 4B (serving as the inlet for the refrigerant when the thermosiphon is in operation) is connected through the pipes to an outlet/inlet 36 for the refrigerant of the outdoor heat-exchanger 2 (serving as the outlet for the refrigerant when the thermosiphon is in operation) such that the outlet/inlet 35 is lower than the outlet/inlet 36. Similarly, an outlet/inlet 38 for the refrigerant of the outdoor heat-exchanger 2 (serving as an outlet for the refrigerant when the thermosiphon is in operation) is arranged higher than an outlet/inlet 37 for the refrigerant of the cooling heat-exchanger 4B (serving as an outlet for the refrigerant when the thermosiphon is in operation). As a result, the cooling heat-transfer medium 40 that is heated by the cooling heat-exchanger 4B and evaporated can flow into the outdoor heat-exchanger 2.

The four-way valve 20 and the three-way valve 21 arranged in the refrigerant circulation channel are disposed such that the pipes for the refrigerant connected thereto are substantially parallel to each other and that there occurs no pipe that extends downward in a vertical direction, so that the refrigerant 40 that has been gasified in the cooling heat-exchanger 4B can move up and flow into the outdoor heat-exchanger 2 with ease.

It is known to provide the system with a pipe that bypasses the compressor in order to constitute a thermosiphon using a refrigeration cycle system. However, it is impossible according to the first embodiment to constitute a thermosiphon only by providing the system with a bypass circuit that bypasses the compressor 1. This is because the air-conditioning heat-exchanger 4A, which is not utilized, is connected to either the intake pipe 11 or the discharge pipe 10 of the compressor 1, so that no cycle can be formed. According to the first embodiment, therefore, use is made of the four-way valve 20, the three-way valve 21, and the expansion valve 22A such that the air-conditioning heat-exchanger 4A and the cycle of thermosiphon do not communicate with each other. Specifically, the expansion valve 22A is made fully closed and further, the four-way valve 20 is switched such that the heat-exchanger 4 is connected to one of the intake pipes 10 and the discharge pipe 11 that is not connected to the cooling heat-exchanger 4B through the three-way valve 21. In other words, the outlet/inlet 37 for the refrigerant of the cooling heat-exchanger 4B and the outlet/inlet 38 for the refrigerant of the outdoor heat-exchanger 2 are directly communicated with each other through the four-way valve 20 and the three-way valve 21 without intermediary of the compressor 1, the expansion valve 22A is fully closed, and the compressor 1 is inactivated to allow the operation of cooling the heat-liberation component 9 to be performed by thermosiphon.

Figure 8:
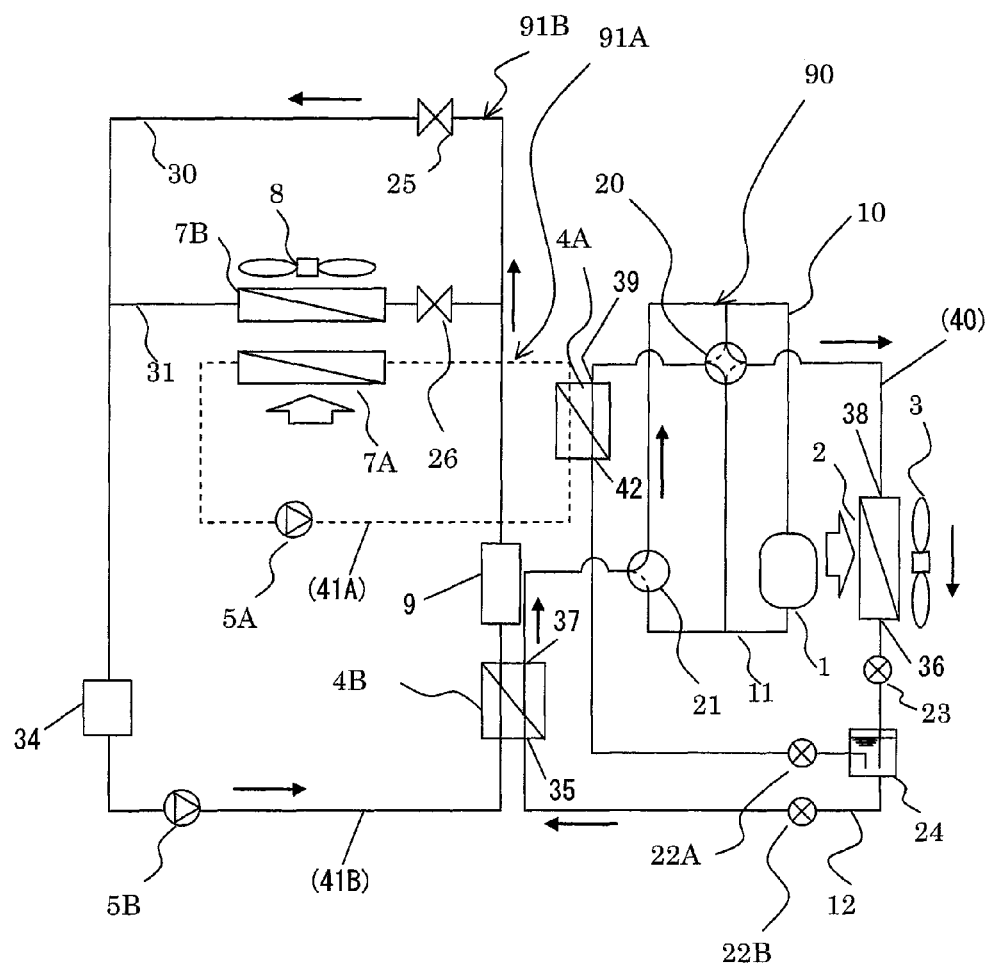
FIG. 8 presents a schematic diagram showing a construction of a vehicle air-conditioning apparatus according to the first embodiment of the present invention, illustrating the flow of the refrigerant upon a cooling thermosiphon operation.

When the four-way vale 20 is connected as indicated in solid line in FIG. 8, for example, after the cooling operation is performed, a cooling siphon mode is used. In this case, the discharge pipe 10 is connected to the outdoor heat-exchanger 2 through the four-way valve 20 and the intake pipe 11 is connected to the air-conditioning heat-exchanger 4A through the four-way valve 20. On the other hand, the cooling heat-exchanger 4B is connected to the discharge pipe 10 through the three-way valve 21. By holding the expansion valve 22A fully closed, it is possible to shut off the compressor 1 and the refrigerant pipe connected to the air-conditioning heat-exchanger 4A from the cycle that forms a thermosiphon. The cooling heat-exchanger 4B can be shut off from the intake pipe 11 since the pipe to be connected therewith can be switched from the intake pipe 11 to the discharge pipe 10 by means of the three-way valve 21.

To flow the refrigerant 40 into the bypass circuit that bypasses the compressor 1 through a two-way valve, it is necessary use a two-way valve that opens the circuit that bypasses the compressor 1 and a two-way valve that shuts off the cooling heat-exchanger 4B and the intake pipe 11, resulting in that the circuit becomes complex. In addition, it is not preferred to provide a plurality of valves in a low-pressure pipe since there will occur an increase in pressure loss and an increase in cost. In the first embodiment, the pipe to which the cooling heat-exchanger 4B is connected is switched from the intake pipe 11 to the discharge pipe 10 and at the same time the cooling heat-exchanger 4B and the intake pipe 11 can be shut off by using the three-way valve 31. As a result, it is become easy to form a channel and shut off the channel, which prevents an increase in cost. Note that in the first embodiment, an example in which the three-way valve 21 is used is presented. However, it is also possible to use the four-way valve with a portion of it being closed.

In the cooling operation, the air-conditioning heat-exchanger 4A is used as an evaporator, so that the temperature of the air-conditioning heat-exchanger 4A is low, for example, after the cooling operation. If the air-conditioning heat-exchanger 4A is incorporated into the cycle of thermosiphon as it is, there is the possibility that various inconveniences may occur; the refrigerant, which normally should be condensed by the outdoor heat-exchanger 2, is condensed in the air-conditioning heat-exchanger 4A and the refrigerant is accumulated therein, thereby causing a deficiency of the refrigerant in the cycle, so that no thermosiphon can be formed. According to the first embodiment, it is possible to solve the problem specific to the air-conditioning apparatus that is provided with a plurality of heat-exchangers by shutting off the air-conditioning heat-exchanger 4A from the cycle of thermosiphon and the cooling operation for cooling the heat-liberation component 9 can be performed by using thermosiphon without operating the compressor 1.

Figure 9:
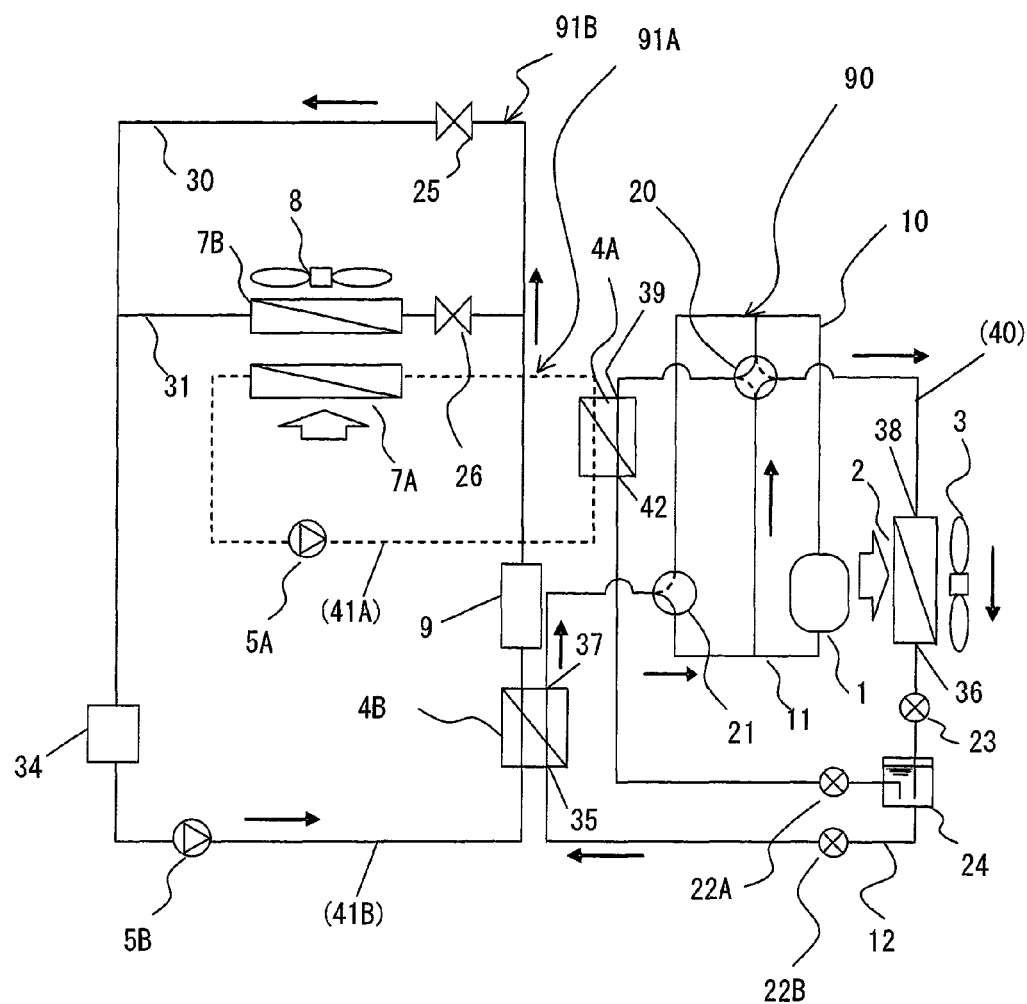
FIG. 9 presents a schematic diagram showing a construction of a vehicle air-conditioning apparatus according to the first embodiment of the present invention, illustrating the flow of the refrigerant upon a heating thermosiphon operation.

In case where the four-way valve 20 is connected to the circuit as indicated in solid line as shown in FIG. 9, for example, after the heating operation is performed, the operation mode is switched to a heating siphon mode. On this occasion, the air-conditioning heat-exchanger 4A is connected to the discharge pipe 10 of the compressor 1 through the four-way valve 20, so that the three-way valve 21 is switched such that the cooling heat-exchanger 4B and the intake pipe 11 can be communicated with each other and the expansion valve 22A is fully closed. The gaseous refrigerant heated in the cooling heat-exchanger 4B flows into the intake pipe 11 through the three-way valve 21 and then into the outdoor heat-exchanger 2 through the four-way valve 20. The liquefied refrigerant condensed in the outdoor heat-exchanger 2 flows into the cooling heat-exchanger 4B arranged downward through the liquid pipe 12 and heated again by the cooling heat-transfer medium 41B.

According to the first embodiment, an example in which the receiver tank 24 is provided in the liquid pipe 12 is presented. If the pipe that connects the cooling heat-exchanger 4B to the receiver tank 24 is a vertical pipe arranged in the inside of the receiver tank 24 extending from the upper surface to the bottom surface, there occurs a problem that the liquid refrigerant that has flown into the receiver tank 24 from the outdoor heat-exchanger 2 cannot flow into the cooling heat-exchanger 4B unless it does not moves up through the vertical pipe. Accordingly, in the first embodiment, the pipe that is to be connected to the cooling heat-exchanger 4B is connected to a bottom surface (lower part) of the receiver tank 24 and the pipe to be connected to the expansion valve 23 is connected to an upper surface (upper part) of the receiver tank 24. Thus, the vertical pipe communicates the bottom surface (lower part) of the receiver tank 24 with the top surface (upper part) of the receiver tank 24. As a result, the liquid refrigerant that has flown into the top surface (upper part) of the receiver tank 24 from the outdoor heat-exchanger 2 drops onto the bottom surface (lower part) of the receiver tank 24 by the effect of gravity to flow into the cooling heat-exchanger 4B with ease.

The two-way valves 25 and 26 are switched between open and close depending on the load of heating/air conditioning. When there is no load of heating, the two-way valve 25 is opened while the two-way valve 26 is closed to use the bypass circuit 30. On the contrary, when there is a load of heating, the two-way valve 25 is closed while the two-way valve 26 is opened to allow the refrigerant 41B for cooling to flow into the outdoor heat-exchanger 7B. On this occasion, the open degree of the expansion valve 22B is controlled to control the amount of the refrigerant to be circulated in the cycle utilizing thermosiphon such that the temperature of the cooling heat-transfer medium 41B reaches a predetermined temperature suitable for performing heating operation.

Second Embodiment

Figure 10:
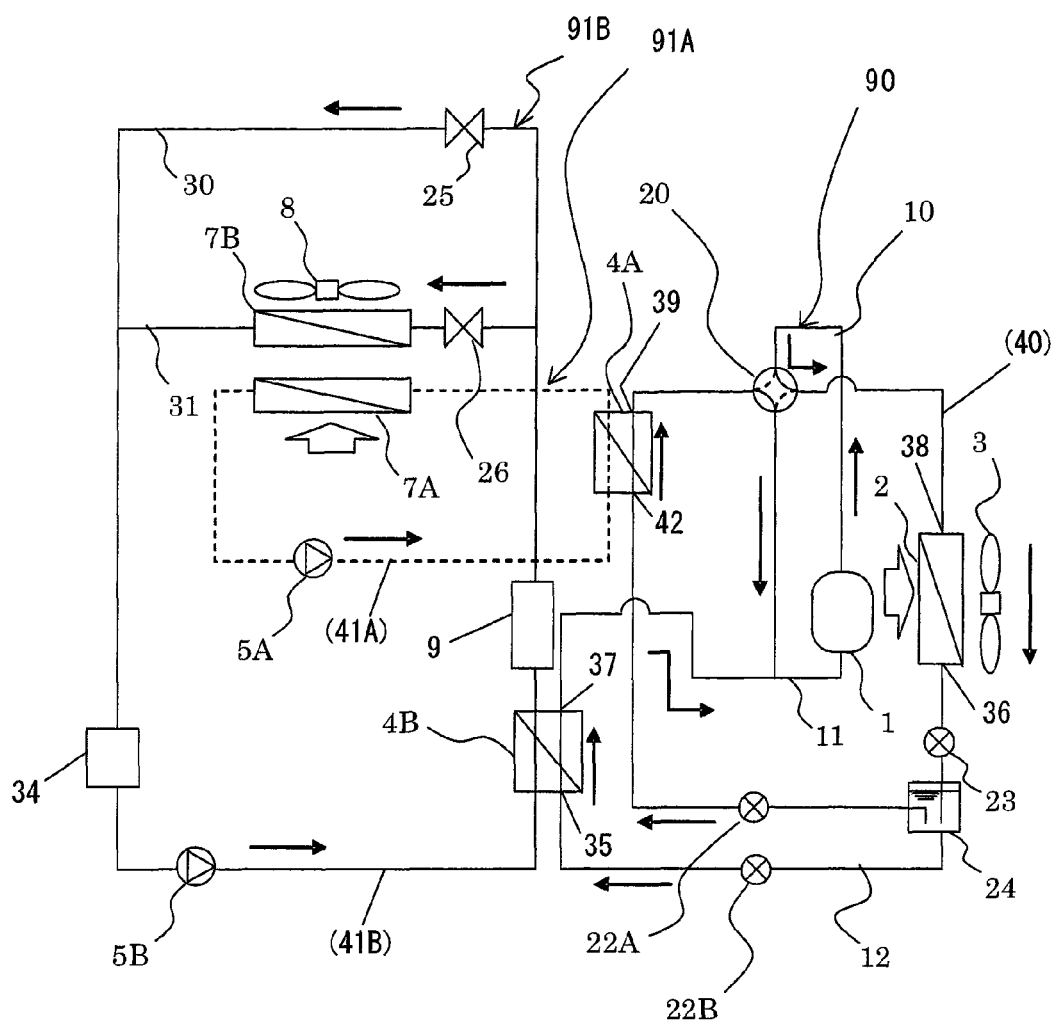
FIG. 10 presents a schematic diagram showing a construction of a vehicle air-conditioning apparatus according to a second embodiment of the present invention, illustrating the flow of a refrigerant upon a heating operation.

FIG. 10 presents a schematic diagram showing a construction of a vehicle air-conditioning apparatus according to a second embodiment of the present invention. This diagram illustrates the flow of the refrigerant upon cooling operation. Apparatuses and components that are the same as or similar to those explained with reference to FIGS. 1 to 9 are given the same reference numbers and explanation thereon is focused on differences between the first and the second embodiments. In the second embodiment, the three-way valve 21 used in the first embodiment as shown in FIGS. 1 to 9 is not used and the outlet/inlet 37 of the cooling heat-exchanger 4B is connected to the intake pipe 11 of the compressor 1. An electric circuit according to the second embodiment is the same as the electric circuit used in the first embodiment as shown in FIG. 2 except that the three-way valve 21 and the drive circuit 21d are omitted. Therefore, illustration and explanation of the electric circuit is omitted herein.

The functions of the vehicle air-conditioning apparatus according to the second embodiment correspond to the functions of the vehicle air-conditioning apparatus according to the first embodiment from which is omitted the function of heat-liberation component heating operation mode as shown in FIG. 5, that is, the function that the cooling heat-exchanger 4B is connected to the discharge pipe 10 of the compressor 1 to allow the cooling heat-exchanger 4B as an evaporator and the temperature of the heat-liberation component 9 is elevated to a suitable temperature. According to the second embodiment, thermosiphon operation cannot be performed in addition to the heat-liberation component heating operation. However, the air-conditioning apparatus according to the second embodiment is advantageous for the vehicle air-conditioning apparatus used under conditions where such a function is not needed since omission of the three-way valve 21 results in a decrease in cost.

Third Embodiment

Figure 11:
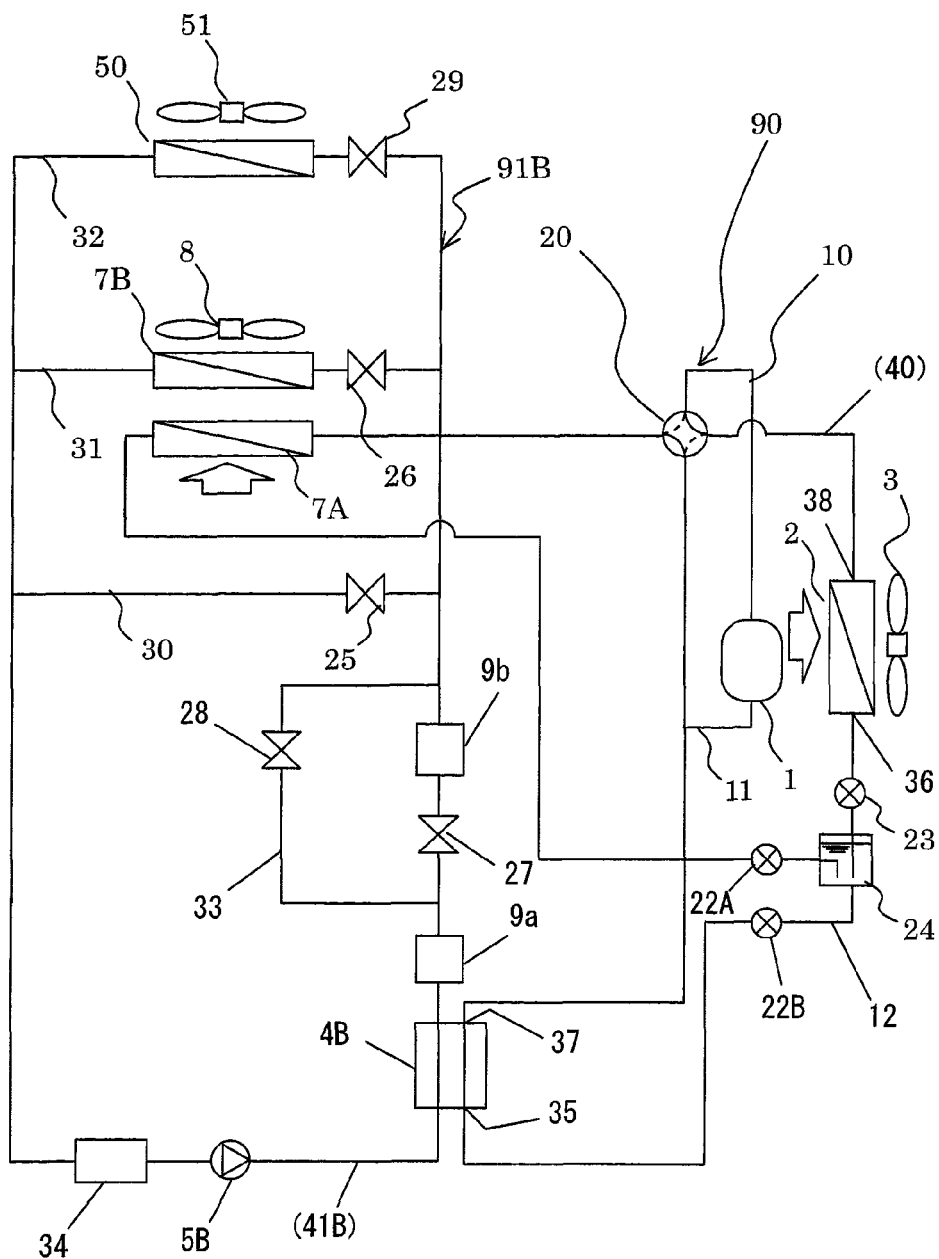
FIG. 11 presents a schematic diagram showing a construction of a vehicle air-conditioning apparatus according to a third embodiment of the present invention.

FIG. 11 presents a schematic diagram showing a construction of an air-conditioning apparatus according to a third embodiment of the present invention. The third embodiment is different from the first embodiment as shown in FIGS. 1 to 9 in the following points. That is, according to the third embodiment, the independent air-conditioning heat-transfer medium circulation channel 91A and the air-conditioning heat-exchanger 4A are eliminated. Instead, it is configured such that the refrigerant 40 in the refrigeration cycle system refrigerant circulation channel 90 is guided to the indoor heat-exchanger 7A, in which direct heat-exchange is performed between the refrigerant 40 and the air introduced into the vehicle interior. Furthermore, in contrast to the first embodiment, the three-way valve 21 is omitted and the cooling heat-exchanger 4B is connected to the intake pipe 11 of the compressor 1 to constitute the refrigeration cycle system refrigerant circulation channel 90. In the vehicle air-conditioning apparatus according to the third embodiment, a part of the refrigeration cycle system refrigerant circulation channel 90 is used as a heat-exchange circuit for air-conditioning and the air-conditioning heat-exchanger 4A in the heat-exchange circuit for air-conditioning and the cooling heat-exchanger 4B in the cooling heat-transfer medium circulation channel 91B are connected parallel to each other in the refrigeration cycle system refrigerant circulation channel 90.

Figure 12:
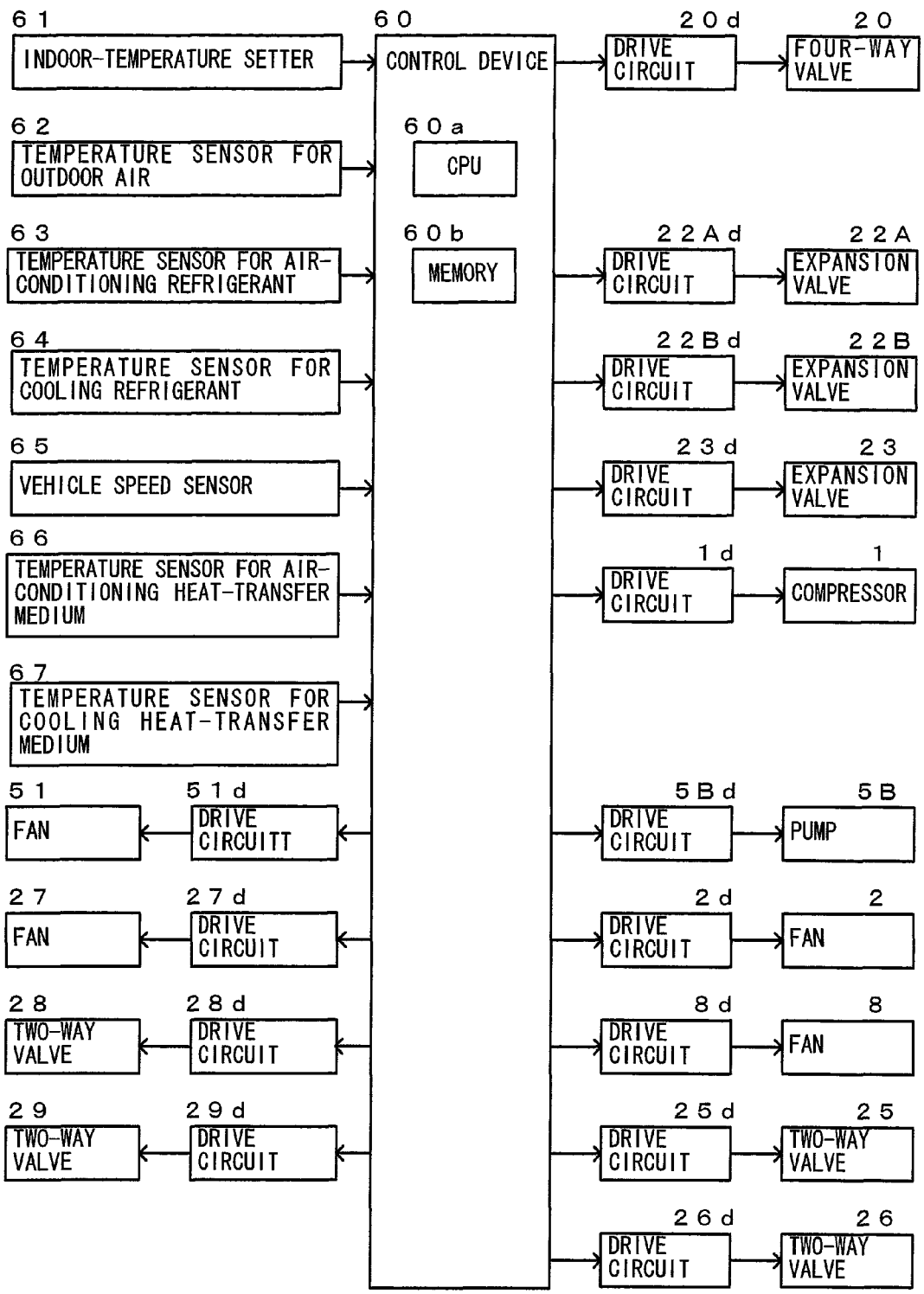
FIG. 12 presents a block diagram showing an electric circuit of a vehicle air-conditioning apparatus according to the third embodiment of the present invention.

FIG. 12 presents a block diagram showing an electric circuit of the vehicle air-conditioning apparatus according to the third embodiment. In FIG. 12, apparatuses and components that are the same as or similar to those explained with reference to FIG. 2 are given the same reference numbers and explanation thereon is focused on differences between the first and the third embodiments. In the third embodiment, the three-way valve 21 and the drive circuit 21d therefor, and the circulation pump 5A and the drive circuit 5A therefor used in the first embodiment as shown in FIG. 2 are omitted and instead two-way valves 27 to 29 and drive circuits 27d to 29d therefor and a heat-releasing fan 51 and a drive circuit 51d therefor are added to the system.

The cooling operation and heating operation or the operation for cooling the heat-liberation component 9 (heat-liberation component cooling operation) are performed in the same manner as those operations performed according to the first embodiment. The air-conditioning apparatus according to the third embodiment, however, does not include the air-conditioning heat-exchanger 4A. This makes it possible to avoid a decrease in heat-exchange capability due to the intermediary heat-exchanger provided between the primary refrigerant circulation channel, i.e., refrigeration cycle system refrigerant circulation channel 90 and the secondary heat-transfer medium circulation channel, i.e., air-conditioning neat medium circulation channel 91A and an increase in power consumption due to the circulation pump. This allows for further suppression of the power consumption. In addition, omission of the intermediary heat-exchanger, the circulation pump and the air-conditioning heat-transfer medium circulation channel allows for a reduction in weight of the air-conditioning apparatus. Also, omission of the three-way valve simplifies the cycle system although heating-dehumidifying operation or operation by thermosiphon cannot be performed. The omission of the three-way valve also provides a merit that the weight of the apparatus can be decreased.

FIG. 11 shows an example of the third embodiment, in which two types of heat-liberation component, i.e., an heat-liberation component 9a and an heat-liberation component 9b are provided in the cooling heat-transfer medium circulation channel 91B and a bypass circuit 33 and two-way valves 27 and 28 for controlling the flow rate of the bypass circuit 33 are provided. According to the third embodiment, an operation in which the cooling heat-transfer medium 41B is not flown into the heat-liberation component 9b can be performed. For example, when it is desired to elevate the temperature of the heat-liberation component 9b promptly, or when the temperature of the cooling heat-transfer medium 41B is too low, the two-way valve 27 is closed and the two-way valve 28 is opened to shut off the flow of the cooling heat-transfer medium 41B to the heat-liberation component 9b. This allows elevation of the temperature of the heat-liberation component 9b due to heat generated the heat-liberation component 9b itself. When the amount of generated heat is small and hence cooling is unnecessary, the bypass circuit 33 can be used. Furthermore, by opening both the two-way valves 27 and 28 and controlling the flow rate of the cooling heat-transfer medium 41B flown into the heat-liberation component 9b, the cooling capability of the apparatus for cooling the heat-liberation component 9b can be suppressed. Therefore, the temperature of the heat-liberation component 9b can be maintained higher than the temperature of the heat-liberation component 9a and the two types of the heat-liberation component 9a and 9b may be maintained at predetermined temperatures, respectively.

Also, according to the third embodiment, there are provided, in the cooling heat-transfer medium circulation channel 91B, a radiator 50 that performs heat-exchange between the cooling heat-transfer medium 41B and outdoor air, a radiation fan 51 that blows the outdoor air to the radiator 50, and a two-way valve 29 that controls the flow rate of the cooing heating medium 41B that flows into the radiator 50. As a result, it is possible to perform heat-exchange between the cooling heat-transfer medium 41B and the outdoor air by the radiator 50 without resort to the refrigeration cycle system refrigerant circulation channel 90. Therefore, when the temperature of the outside air is low, heat release to the outside air can be accomplished only by operating the circulation pump 5B and the radiation fan 51 without using the compressor 1.

Variations of Third Embodiment

Figure 13:
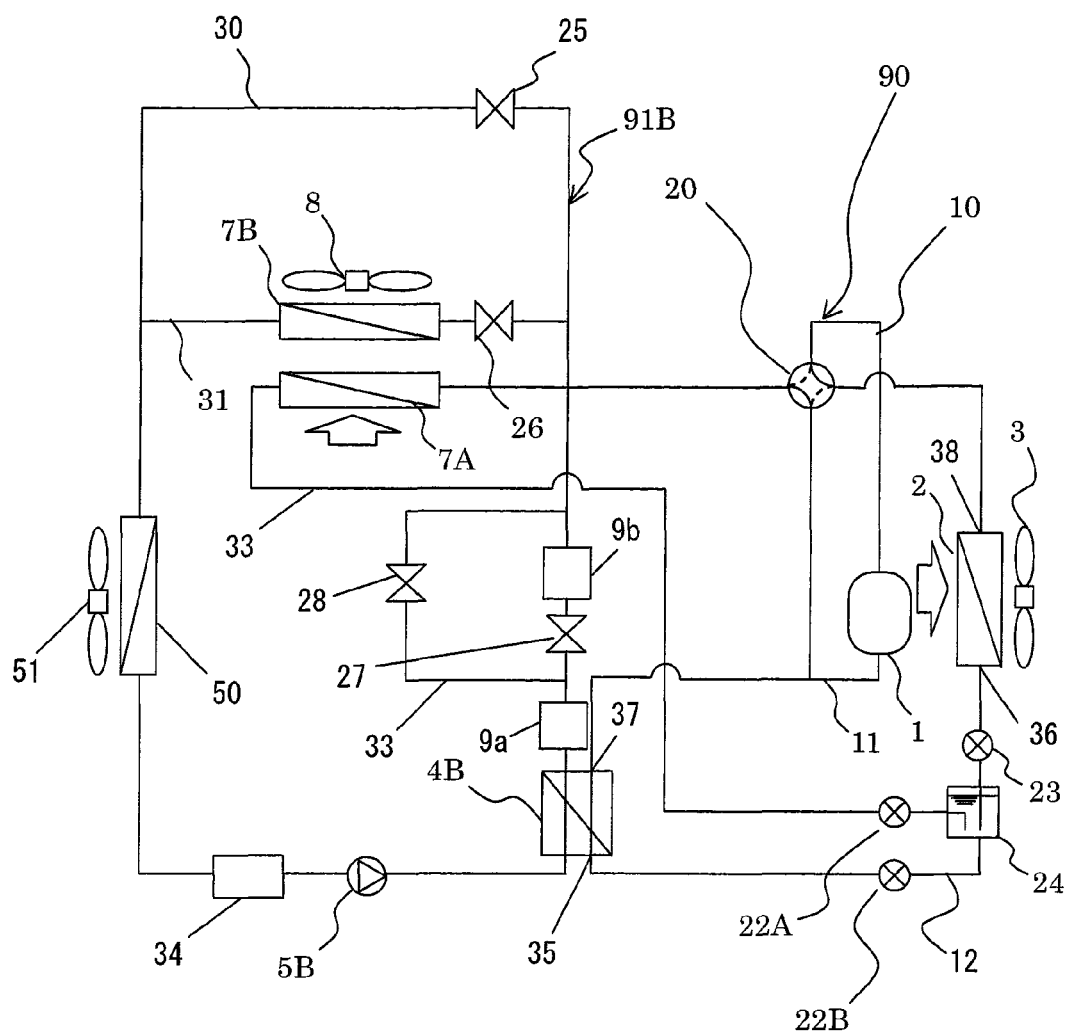
FIG. 13 presents a schematic diagram showing a construction of a vehicle air-conditioning apparatus according to a variation of the third embodiment of the present invention.

The apparatus according to the third embodiment shown in FIG. 11 includes the radiator 50 in parallel to the indoor heat-exchanger 7B in the cooling heat-transfer medium circulation channel 91B. However, the radiator 50 may be provided in series to the indoor heat-exchanger 7B as shown in FIG. 13. By the addition of the radiator 50, that release to the outside air can be performed without resort to the refrigeration cycle system refrigerant circulation channel 90. For example, when the load of heating for heating the vehicle interior is decreased while the heating-heat releasing operation is performed, the amount of heat released to the vehicle interior is decreased so that heat release cannot be accomplished completely. In this case, the state of deficient capability of heat release can be solved by releasing heat to the outside air by means of the radiator 50. If there is yet a deficiency in the capability of heat release even when heat release to the vehicle interior and heat release to the outside air by providing the radiator 50 for releasing heat to the outside air in the cooling heat-transfer medium circulation channel 91B and flowing the cooling heat-transfer medium 41B in a route passing thorough the heat-liberation component 9, the indoor heat-exchanger 7B, the radiator 50, and the cooling heat-exchanger 4B in this order, cooling is finally performed by means of the cooling heat-exchanger 4B.

Fourth Embodiment

Figure 14:
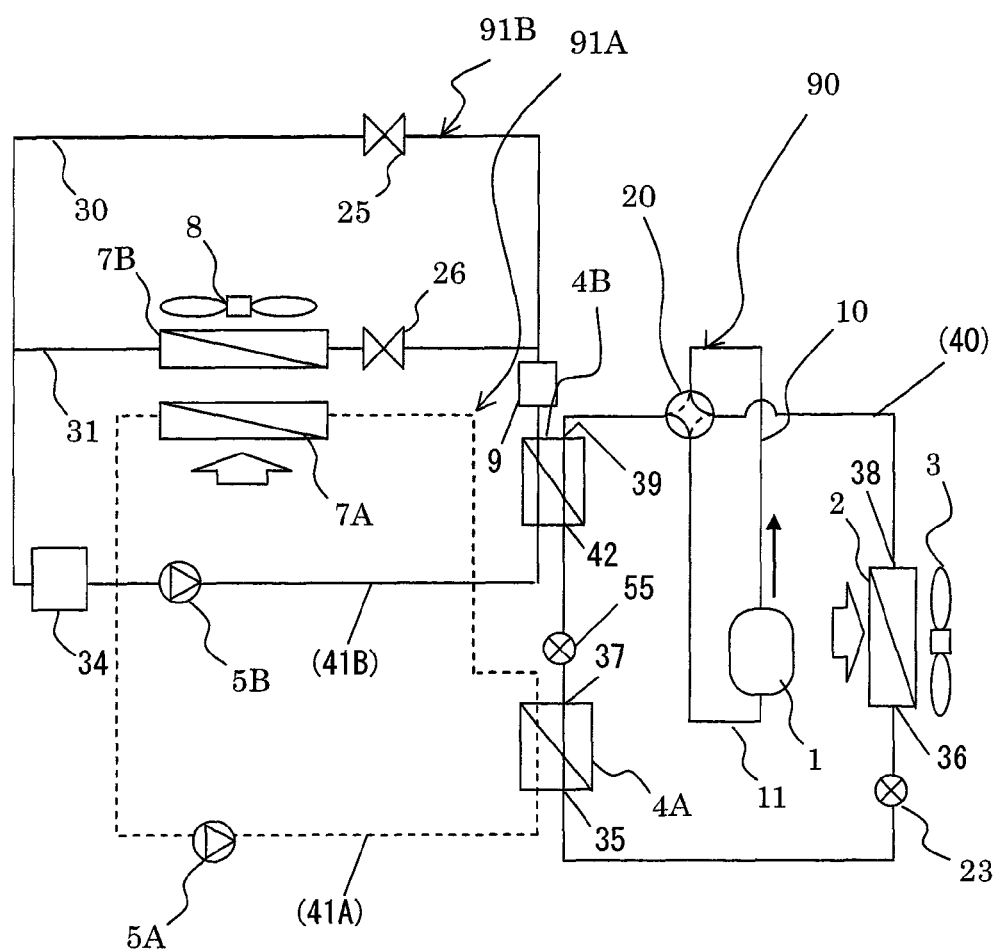
FIG. 14 presents a schematic diagram showing a construction of a vehicle air-conditioning apparatus according to a fourth embodiment of the present invention.

FIG. 14 presents a schematic diagram showing a construction of an vehicle air-conditioning apparatus according to a fourth embodiment of the present invention. Apparatuses and components that are the same as or similar to those explained with reference to FIG. 1 are given the same reference numbers and explanation thereon is focused on differences between the first and the fourth embodiments. The vehicle air-conditioning apparatus according to the fourth embodiment is different from the apparatus according to the first embodiment in the following point. That is, in contrast to the vehicle air-conditioning apparatus according to the first embodiment, the apparatus according to the fourth embodiment is constructed such that the air-conditioning heat-exchanger 4A and the cooling heat-exchanger 4B are connected to each other in series and an expansion valve (a decompression valve) 55 is provided between the heat-exchangers 4A and 4B.

In case the heat-liberation component 9 is cooled by using the refrigeration cycle system refrigerant circulation channel 90, the four-way valve 20 is switched as indicated in solid line in FIG. 14 to form a refrigeration cycle system in which the outdoor heat-exchanger 2 serves as a condenser and the air-conditioning heat-exchanger 4A and the cooling heat-exchanger 4B serve as evaporators. On this occasion, the expansion valve 55 is kept in a full-open state and the range of decompression is controlled by the expansion valve 23. In the cooling heat-transfer medium circulation channel 91B, the circulation pump 5B is activated to perform the operation in which the cooling heat-transfer medium 41B is flown into the bypass circuit 30 and the cooling heat-transfer medium 41B cooled by the cooling heat exchanger 4B is fed to the heat-liberation component 9 to cool the heat-liberation component 9. In case there is a load of cooling, the circulation pump 5A and the indoor fan 8 are operated to feed the air-conditioning heat-transfer medium 41A cooled by the air-conditioning heat-exchanger 4A having a low temperature to the indoor heat-exchanger 7A, thus cooing the vehicle interior. On this occasion, the temperatures of the air-conditioning heat-transfer medium 41a and the cooling heat-transfer medium 41B can be changed by changing the flow rates of the circulation pumps 5A and 5B, respectively.

Specifically, in case it is desired to elevate the temperature of the cooling heat-transfer medium 41B, the flow rate of the circulation pump 5B is decreased to suppress the amount of heat-exchanged at the air-conditioning heat-exchanger 4B. On the contrary, in case it is desired to decrease the temperature of the cooling heat-transfer medium 41B, the flow rate of the circulation pump 5B is increased. Similarly, the amount heat-exchanged at the air-conditioning heat-exchanger 4A can be controlled by changing the flow rate of the air-conditioning heat-transfer medium 41A by using the circulation pump 5A. Therefore, the temperatures of the air-conditioning heat-transfer medium 41A and the cooling heat-transfer medium 41B can be controlled to any desired temperatures by adjusting the flow rates of the circulation pumps 5A and 5B, respectively. The amount of heat-exchanged at the air-conditioning heat-exchanger 4A positioned downstream can be suppressed by throttling or narrowing the expansion valve 23 to increase the degree of overheating the refrigerant at the outlet of the cooling heat-exchanger 4B.

As mentioned above, it is also possible according to the fourth embodiment to cool the air-conditioning heat-transfer medium 41A of the air-conditioning heat-transfer medium circulation channel 91A and the cooling heat-transfer medium 41B of the cooling heat-transfer medium circulation channel 91B by the air-conditioning heat-exchanger 4A and the cooling heat-exchanger 4B, which are different from each other, respectively, so that the temperatures of the air-conditioning heat-transfer medium 41A and the cooling heat-transfer medium 41B can be individually controlled by adjusting the amounts of heat-exchanged of the circulation pumps 5A and 5B, respectively.

Since the cooling heat-transfer medium 41B on relatively high temperature-side is introduced into the indoor heat-exchanger 7B, a so-called reheat defrosting operation, in which air that has been cooled and defrosted by the indoor heat-exchanger 7A is heated again by the indoor heat-exchanger 7B, can be performed. In case where there are loads of heating and air-conditioning, the circulation pump 5B is operated t and the cooling heat-transfer medium 41B is introduced into the indoor heat-exchanger 7B in the same manner as in the first embodiment, so that it is possible to perform a heat releasing operation in which waste heat from the heat-liberation component 9 is fed to the room space or indoor space. Therefore, a heating operation requiring less power consumption than the case where heater or the like is used can be performed.

In case where the heating operation is performed by using the refrigeration cycle system refrigerant circulation channel 90 in combination, the four-way valve 20, is switched as indicated by broken line in FIG. 14. In this case, a refrigeration cycle system is formed, in which the expansion valve 55 is kept in a full-open state, the cooling heat-exchanger 4B and the air-conditioning heat-exchanger 4A are operated as condensers to evaporate the refrigerant 40 decompressed by the expansion valve 23 in the outdoor heat-exchanger 2. In case the temperature of the cooling heat-transfer medium 41B is higher than the temperature of the air-conditioning heat-transfer medium 41B, the refrigerant 40 having a high temperature discharged from the compressor is not condensed/liquefied in the cooling heat-exchanger 4B but will be liquefied in the air-conditioning heat-exchanger 4A. As a result, the temperature of condensation in the refrigeration cycle system refrigerant circulation channel 90 can be suppressed in accordance with the temperature of the air-conditioning heat-transfer medium 41A, which is at a relatively low temperature.

As mentioned above, by providing the system with air-conditioning heat-transfer medium circulation channel 91A and the cooling heat-transfer medium circulation channel 91B, which constitute secondary circuits connected to the refrigeration cycle system refrigerant circulation channel 90, there can be obtained an advantage that the temperature of the heat-transfer medium in each circulation channel can be controlled in any desired manner.

According to the fourth embodiment, the expansion valve 55 is provided between the air-conditioning heat-exchanger 4A and the cooling heat-exchanger 4B. This makes it possible to form a refrigeration cycle system in which the cooling heat-exchanger 4B serves as a condenser and the air-conditioning heat-exchanger 4A and the outdoor heat-exchanger 2 serve as evaporators by throttling the degree of the expansion valve 55. In this construction of the refrigeration cycle system, the cooling heat-transfer medium 41B can be heated while the air-conditioning heat-transfer medium 41A is cooled. As a result, there can be performed a reheating-heating operation in which the air introduced into the vehicle interior is cooled/dehumidified in the indoor heat-exchanger 7A and the air cooled in the indoor heat-exchanger 7B is overheated.

The above-mentioned embodiments and variations thereof may be combined in any desired fashions including combinations of embodiments or combinations of embodiments and variations.

According to the above-mentioned embodiments and variations thereof, there can be obtained advantageous effects as set forth below. Firstly, the air-conditioning apparatus according to one embodiment and a variation thereof is configured to include the refrigerant circulation channel 90 for a refrigeration cycle system in which the compressor 1 that compresses the refrigerant 40, the outdoor heat-exchanger 2 that performs heat-exchange between the refrigerant 40 and the outdoor air, the expansion valve 23 that decompresses the refrigerant 40, and the outdoor heat-exchanger 2 that performs heat-exchange between the refrigerant 40 and air to be introduced into the vehicle interior are connected in a circular pattern, and a heat-exchanger for equipment that performs heat-exchange between the refrigerant 40 and the heat-liberation component 9 (9a, 9b). The heat-exchanger for equipment has the cooling heat-transfer medium circulation channel 91B, which is different from the refrigeration cycle system refrigerant circulation channel. The cooling heat-transfer medium circulation channel 91B is provided with the cooling heat-exchanger 4B that performs heat-exchange between the refrigerant 40 of the refrigeration cycle system refrigerant circulation channel 90 and the cooling heat-transfer medium 41B for cooling the heat-liberation component 9 and the circulation pump for cooling 5B that circulates the cooling heat-transfer medium 41B between the heat-liberation component 9 and the cooling heat-exchanger 4B. In other words, the air-conditioning heat-exchanger that performs heat-exchange between the refrigerant 40 and the air introduced into the vehicle interior and the heat-exchanger for equipment that performs heat-exchange between the refrigerant 40 and the heat-liberation component 9 are connected to each other in parallel. The parallel-connected heat-exchangers, the compressor 1, the outdoor heat-exchanger 2, and the expansion valve 23 are connected in a circular pattern to constitute the refrigeration cycle system refrigerant circulation channel 90. As a result, the temperatures of the portions of the refrigerant 40 that flow through the air-conditioning heat-exchanger and the heat-exchanger for equipment can be set at suitable temperatures that are optimal for the air-conditioning heat-exchanger and the heat-exchanger for equipment, respectively. This can suppress the power consumption of the refrigeration cycle system. In addition, since the temperature of the heat-liberation component can be prevented from being lower than the temperature of the air outside the vehicle interior, a countermeasure for preventing dew condensation on the heat-liberation component becomes unnecessary.

The air-conditioning heat-exchange circuit may be configured to have the air-conditioning heat-transfer medium circulation channel 91A, which is different from the refrigeration cycle system refrigerant circulation channel 90. The air-conditioning heat-transfer medium circulation channel 91A may be provided with the air-conditioning heat-exchanger 4A that performs heat-exchange between the refrigerant 40 of the refrigeration cycle system refrigerant circulation channel 90 and the air-conditioning heat-transfer medium 41A for air-conditioning the vehicle interior, the indoor heat-exchanger 7A that performs heat-exchange between the air to be introduced into the vehicle interior and the air-conditioning heat-transfer medium 41A, and the air-conditioning circulation pump 5A that circulates the air-conditioning heat-transfer medium 41A between the air-conditioning heat-exchanger 4A and the indoor heat-exchanger 7A. Alternatively, the air-conditioning heat-exchange circuit may be configured to have the indoor heat-exchanger 7A that performs heat-exchange between the air to be introduced into the vehicle interior and the refrigerant 40, into which the refrigerant 40 in the refrigeration cycle system refrigerant circulation channel 90 is circulated as the air-conditioning heat-transfer medium 41A for air-conditioning the vehicle interior. Either one of the configurations allows the temperatures of the portions of the refrigerant 40 that flow through the air-conditioning heat-exchange circuit and the equipment heat-exchange circuit can be set at optimal temperatures for air-conditioning the vehicle interior and cooling the heat-liberation component, respectively.

According to one embodiment and a variation thereof, the air-conditioning apparatus is configured such that the air-conditioning heat-exchange circuit is connected to the expansion valve 23 through the air-conditioning expansion valve 22A that decompresses the refrigerant and the cooling heat-exchanger 4B of the cooling heat-transfer medium circulation channel 91B is connected to the expansion valve 23 through the cooling expansion valve 22B that decompresses the refrigerant 40. As a result, the flow rates of the portions of the refrigerant 40 that flow through the air-conditioning heat-exchange circuit and the equipment heat-exchange circuit can be set at any desired values, respectively, so that the temperatures of the portions of the refrigerant 40 that flow through the air-conditioning heat-exchange circuit and the equipment heat-exchange circuit can be set at suitable temperatures that are optimal to air-conditioning the vehicle interior and cooling (or heating) the heat-liberation component, respectively.

According to one embodiment and a variation thereof, the air-conditioning apparatus is configured such that the air-conditioning heat-exchange circuit and the outdoor heat-exchanger 2 are connected to the compressor 1 through the four-way valve 20 to make it possible to switchably connect one of the air-conditioning heat-exchange circuit and the outdoor heat-exchanger 2 with the discharge pipe 10 of the compressor 1 and the other to the intake pipe 11 of the compressor 1. As a result, cooling and heating operation for the vehicle interior and cooling or heating operation for the heat-liberation component 9 can be performed.

According to one embodiment and a variation thereof, the air-conditioning apparatus is configured such that the cooling heat-transfer medium circulation channel 91B is provided with the indoor heat-exchanger 7B that performs heat-exchange between the air to be introduced into the vehicle interior and the cooling heat-transfer medium 41B and the outdoor heat-exchanger 7B is arranged on the downstream side of the flow of the air from the indoor heat-exchanger 7A so that the air to be introduced into the vehicle interior that has passed through the indoor heat-exchanger 7A can pass through the indoor heat-exchanger 7B. As a result, the waste heat from the heat-liberation component 9 can be utilized for heating the vehicle interior, and hence the power consumed for heating by refrigeration cycle system can be saved. Also, the air cooled in the indoor heat-exchanger 7A on the upstream side can be reheated in the indoor heat-exchanger 7B. This reheating-dehumidifying operation can provide comfortable air-conditioning of the vehicle interior.

According to one embodiment and a variation thereof, the air-conditioning apparatus is configured to include the bypass channel 30 that bypasses the indoor heat-exchanger 7B and the two-way valves 25 and 26 that control the flow rate of the cooling heat-transfer medium 41B flowing through the indoor heat-exchanger 7B and the bypass channel 30. As a result, the flow rates of the portions of the cooling heat-transfer medium 41B that flow through the indoor heat-exchanger 7B and the bypass channel 30 can be controlled, respectively, depending on the requirement of the equipment heat-exchange circuit.

According to one embodiment and a variation thereof, the air-conditioning apparatus is configured such that the cooling heat-exchanger 4B of the cooling heat-transfer medium circulation channel 91B is switchably connected to the discharge pipe 10 or the intake pipe 11 of the compressor 1 through the three-way valve 21. As a result, it is possible to perform defrosting operation for the vehicle interior and in addition it is possible to realize thermosiphon that cools the heat-liberation component 9 without operating the compressor 1.

According to one embodiment and a variation thereof, the air-conditioning apparatus is configured such that the receiver tank 24 is provided at a branching point or diverging point where the flow of the refrigerant 40 discharged from the expansion valve 23 of the refrigeration cycle system refrigerant circulation channel 90 is diverged into the air-conditioning heat-exchange circuit and the cooling heat-exchanger 4B, that is, the receiver tank 24 is set up at a diverging point where three heat-exchangers, i.e., the outdoor heat-exchanger 2, the air-conditioning heat-exchange circuit, and the cooling heat-exchanger 4B are connected. As a result, any of the three heat-exchangers is always operating, causing the refrigerant 40 to flow, so that accumulation or stagnation of the refrigerant or the like inconvenience can be prevented from occurring and the amount of the refrigerant can be reliably adjusted.

According to one embodiment and a variation thereof, the air-conditioning apparatus is configured to include the sensor 66 for detecting the temperature of the air-conditioning heat-transfer medium 41A. The rotation speed of the compressor 1 is controlled by the control device 60 such that the temperature of the air-conditioning heat-transfer medium 41A is a target temperature upon the cooling operation in which the outdoor heat-exchanger 2 is operated as a condenser and the air-conditioning heat-exchange circuit is operated as an evaporator. As a result, the capability of cooling can be controlled depending on the load of cooling.

According to one embodiment and a variation thereof, the air-conditioning apparatus is configured to include the sensor 62 that detects the temperature of the air outside the vehicle interior (or outdoor air) and the sensor 67 that detects the temperature of the cooling heat-transfer medium. The expansion valve for cooling 22B is controlled by the control device 60 such that upon the cooling operation in which the outdoor heat-exchanger 2 is operated as a condenser and the air-conditioning heat-exchange circuit and the cooling heat-exchanger 4B are operated as evaporators, the target temperature of the cooling heat-transfer medium 41B is set at a temperature higher than the temperature of the air outside the vehicle interior and the expansion valve for cooling 22B is controlled so that the temperature of the cooling heat-transfer medium 41B can be the target temperature. This configuration is advantageous as explained below. Without countermeasures, when the temperature of the heat-liberation component 9 becomes lower than the temperature of the air outside the vehicle interior, the heat-liberation component 9 is warmed by the air outside the vehicle interior and the capability of cooling required for the refrigeration cycle system refrigerant circulation channel 90 is increased to the extent that correspond to the amount of heat that warmed the heat-liberation component 9. This increases the power consumption by the refrigeration cycle system. Further, when the temperature becomes lower than the dew point of the air outside the vehicle interior, dew is formed on the heat-liberation component 9, so that it is necessary to take some countermeasure for preventing dew formation from occurring on the heat-liberation component 9 and its pipe channels. According to the present invention, however, the inconveniences can be prevented by setting the target temperature of the cooling heat-transfer medium 41B at a temperature higher than the temperature of the air outside the vehicle interior.

According to one embodiment and a variation thereof, the air-conditioning apparatus is configured to include the sensor 63 that detects the temperature of the refrigerant flowing from the air-conditioning heat-exchange circuit and the sensor 64 that detects the temperature of the refrigerant flow from the cooling heat-exchanger 4B. The expansion valve for cooling 22B is controlled by the control device 60 such that upon the cooling operation, the temperature of the refrigerant that flows out from the cooling heat-exchanger 4B becomes higher than the temperature of the refrigerant that flow out from the air-conditioning heat-exchange circuit. As a result, the temperature of the cooling heat-transfer medium 41B can be kept higher than the temperature of the cooling heat-transfer medium 41A, so that it is possible to realize the so-called reheating-dehumidifying operation in which the air to be introduced into the vehicle interior that has been cooled/dehumidified in the indoor heat-exchanger 7A can be blown into the vehicle interior after it is heated by the indoor heat-exchanger 7B. In addition, the relative humidity of the air to be blown into the vehicle interior is decreased so that the comfort of the vehicle interior can be increased.

According to one embodiment and a variation thereof, the air-conditioning apparatus is configured as follows. Upon the cooling operation in which the indoor heat-exchanger 2 is operated as a condenser and the air-conditioning heat-exchange circuit and the cooling heat-exchanger 4B are operated as evaporators, the operation of the apparatus is controlled by the control device 60 such that a portion or all of the cooling heat-transfer medium 41B is flown into the indoor heat-exchanger 7B through the two-way valves 25 and 26 and the air to be introduced into the vehicle interior that has been cooled in the indoor heat-exchanger 7A is heated in the indoor heat-exchanger 7B. As a result, it is possible to realize the so-called reheating-dehumidifying operation in which the air to be introduced into the vehicle interior that has been cooled/dehumidified in the indoor heat-exchanger 7A can be blown into the vehicle interior after it is heated by the indoor heat-exchanger 7B. In addition, the relative humidity of the air to be blown into the vehicle interior is decreased so that the comfort of the vehicle interior can be increased.

According to one embodiment and a variation thereof, the air-conditioning apparatus is configured as follows. Upon the cooling operation in which the outdoor-heat-exchanger 2 is operated as a condenser and the air-conditioning heat-exchange circuit is operated as an evaporator, the operation of the apparatus is controlled by the control device 60 such that the flow of the refrigerant is switched by the three-way valve 21 to cause the cooling heat-exchanger 4A to serve as a condenser and allow the cooling heat-transfer medium 4B of the cooling heat-transfer medium circulation channel 91B to be heated by the refrigerant 40 of the refrigeration cycle system refrigerant circulation channel 90. As a result, even when the amount of energy for reheating the air to be introduced into the vehicle interior by the indoor heat-exchanger 7B is insufficient, the amount of energy for reheating can be increased by means of the refrigeration cycle system.

According to one embodiment and a variation thereof, the air-conditioning apparatus is configured as follows. The operation of the air-conditioning apparatus is controlled by the control device 60 such that the operation mode of the apparatus is switched by the four-way valve 20 to the heating operation in which the air-conditioning heat-exchange circuit is operated as a condenser and the outdoor heat-exchanger 2 is operated as an evaporator, the flow of the refrigerant 40 to the cooling heat-exchanger 4B is shut off by the expansion valve for cooling 22B, and the cooling heat-transfer medium 41B is flown into the indoor heat-exchanger 7B by using the two-way valves 25 and 26. As a result, it is possible to further heat the air to be introduced into the vehicle interior that has been heated with the condensation heat of refrigeration cycle system in the indoor heat-exchanger 7A by using waste heat from the heat-liberation component 9 in the indoor heat-exchanger 7B. Thus, it is possible to maintain the temperature of the air blown out from the indoor heat-exchanger 7A can be kept lower than the temperature of the air blown out from the indoor heat-exchanger 7B. This allows the condensation temperature of the refrigeration cycle system to be kept low, resulting in a decrease in power consumption in the refrigeration cycle system.

According to one embodiment and a variation thereof, the air-conditioning apparatus is configured as follows. Upon the heating operation, the rotation speed of the compressor 1 is controlled by the control device 60 such that the temperature of the cooling heat-transfer medium 41B is the target temperature. As a result, it is possible to control the capability of heating of the refrigeration cycle system in response to variation of the amount of generated heat from the heat-liberation component 9 or variation of load of heating, so that the variation of the temperature of the blown out air due to these variations can be suppressed.

According to one embodiment and a variation thereof, the air-conditioning apparatus is configured as follows. The operation of the air-conditioning apparatus is controlled by the control device 60 such that the operation mode of the apparatus is switched by the four-way valve 20 to the heating operation in which the air-conditioning heat-exchange circuit is operated as a condenser and the outdoor heat-exchanger 2 is switched by the three-way valve 21 to operate as an evaporator, and the cooling heat-transfer medium 41B is directed to the bypass channel 30 by using the two-way valves 25 and 26. As a result, it is possible to perform heating the vehicle interior while cooling the heat-liberation component 9.

According to one embodiment and a variation thereof, the air-conditioning apparatus is configured to include the indoor fan 8 that blows the air to be introduced into the vehicle interior to the indoor heat-exchanger 7A and the indoor heat-exchanger 7B. The operation of the apparatus is controlled by the control device 60 such that at the start of the heating operation, the indoor fan 8 is inactivated until the temperature of the air-conditioning heat-transfer medium 41A reaches a predetermined temperature. As a result, it is possible to avoid the inconvenience that upon start of the heating operation, the air to be blown into the vehicle interior is cooled by the cooling heat-transfer medium 41A being at a relatively lower temperature, so that cold air will not be blown into the vehicle interior.

According to one embodiment and a variation thereof, the air-conditioning apparatus is configured as follows. The operation of the air-conditioning apparatus is controlled by the control device 60 such that the outdoor heat-exchanger 2 is operated as a condenser, the cooling heat-exchanger 4B is operated as an evaporator, the flow of the refrigerant 40 to the air conditioning heat-exchange circuit is shut off by means of the expansion valve for air-conditioning 22A, and the cooling heat-transfer medium 41B is flown through the bypass channel 30 to perform a defrosting operation of the outdoor heat-exchanger. As a result, the defrosting of the outdoor heat-exchanger 2 can be operated by utilizing the waste heat from the heat-liberation component 9.

According to one embodiment and a variation thereof, the air-conditioning apparatus is configured to include the outdoor fan 3 that blows the air outside the vehicle interior to the outdoor heat-exchanger 2 and the sensor 65 that detects the speed of the vehicle. The operation of the air-conditioning apparatus is controlled by the control device 60 such that upon the defrosting operation, the outdoor fan 3 is rotated in an inverse direction with respect to the direction of rotation of the outdoor fan 3 upon the non-defrosting operation and the speed of the rotation of the outdoor fan 3 is controlled depending on the speed of the vehicle. As a result, it is possible to prevent the capability of defrosting from being reduced due to wind caused by running the vehicle blowing the outdoor heat-exchanger 2.

According to one embodiment and a variation thereof, the air-conditioning apparatus is configured as follows. In the piping for the refrigerant that communicates between the outdoor heat-exchanger 2 and the cooling heat-exchanger 4B through the expansion valve 23 and the expansion valve for cooling 22B, a connection port at which the cooling heat-exchanger 4B is connected with the expansion valve for cooling 22B is arranged at a position lower than a connection port at which the outdoor heat-exchanger 2 is connected with the expansion valve 23. On the other hand, in the piping for the refrigerant that communicates between the cooling heat-exchanger 4B and the outdoor heat-exchanger 2 through the three-way valve 21 and the four-way valve 20, a connection port at which the outdoor heat-exchanger 2 and the four-way valve 20 is arranged at a position higher than a connection port at which the cooling heat-exchanger 4B with the three-way valve 21. In addition, the piping for the refrigerant that communicates between the cooling heat-exchanger 4B and the outdoor heat-exchanger 2 through the three-way valve 21 and the four-way valve 20 is set up substantially horizontally. Moreover, the air-condition apparatus is configured to include the sensor 67 that detects the temperature of the cooling heat-transfer medium 41B and the sensor 62 that detects the temperature of the air outside the vehicle interior. The operation of the air-conditioning apparatus is controlled by the control device 60 to perform the cooling operation for cooling the heat-liberation component 9 by thermosiphon in which when the temperature of the cooling heat-transfer medium 41B is higher than the temperature of the air outside the vehicle interior, the cooling heat-exchanger 4B and the outdoor heat-exchanger 2 are directly communicated by the four-way valve 20 and the three-way valve 21, the flow of the refrigerant 40 to the air-conditioning heat-exchanger 4A is shut off by the expansion valve for air-conditioning 22A, and the compressor 1 is inactivated. As a result, a cycle utilizing thermosiphon can be formed so that the heat-liberation component 9 can be cooled without activating the compressor 1.

According to one embodiment and a variation thereof, the air-conditioning apparatus is configured such that the liquid piping that communicates the cooling heat-exchanger 4B with the receiver tank 24 through the expansion valve for cooling 22B is connected to the lower portion of the receiver tank 24 and the liquid piping that communicates the outdoor heat-exchanger 2 with the receiver tank 24 through the expansion valve 23 is connected to the upper portion of the receiver tank 24. As a result, the liquid refrigerant that has flown into the receiver tank 24 can readily flow into the cooling heat-exchanger 4B by the effect of gravity.

According to one embodiment and a variation thereof, the air-conditioning apparatus is configured as follows. When there is provided with a plurality of heat-liberation components 9, the heat-liberation components are arranged along the direction of flow of the cooling heat-transfer medium 41B that flows in the cooling heat-transfer medium circulation channel 91B from the upstream to the downstream in order of increasing permissible temperature or in order of increasing thermal time constant. As a result, it is possible to prevent the cooling heat-transfer medium 41B that has been heated by other heat-liberation component to an elevated temperature from flowing into an heat-liberation component that has a relatively low permissible temperature or a relatively low thermal time constant, so that appropriate cooling corresponding to the permissible temperature or thermal time constant of the heat-liberation component can be performed.

The above explanation is only provided by way of example; the present invention is not to be considered as being limited in any way by the details of the disclosed embodiments.

What is claimed is:

1. A moving vehicle air-conditioning apparatus to be set up on a vehicle, the apparatus comprising:
a refrigerant circulation channel through which a refrigerant flows, the refrigerant circulation channel being provided in a refrigeration cycle system including,
a compressor that compresses the refrigerant,
an outdoor heat-exchanger that performs heat-exchange between the refrigerant and an outdoor air, and
an expansion valve that reduces pressure of the refrigerant;
an air-conditioning heat-transfer medium circulation channel that circulates therein an air-conditioning heat-transfer medium for air-conditioning of a vehicle interior;
an equipment heat-transfer medium circulation channel that circulates therein an equipment heat-transfer medium for adjusting a temperature of an in-vehicle equipment;
an air-conditioning heat-exchanger that is connected to the refrigerant circulation channel provided in the refrigeration cycle system and to the air-conditioning heat-transfer medium circulation channel and that performs heat exchange between the refrigerant and the air-conditioning heat-transfer medium;
an equipment heat-exchanger that is connected to the refrigerant circulation channel provided in the refrigeration cycle system and to the equipment heat-transfer medium circulation channel and that performs heat exchange between the refrigerant and the equipment heat-transfer medium;
a first channel-switching valve, through which a discharge pipe and an intake pipe of the compressor are connected, and with which a first connection state where the discharge pipe of the compressor and the outdoor heat-exchanger are connected and, at the same time, the intake pipe of the compressor and the air-conditioning heat-exchanger are connected and a second connection state where the discharge pipe of the compressor and the air-conditioning heat-exchanger are connected and, at the same time, the intake pipe of the compressor and the outdoor heat-exchanger are connected are switchable therebetween;

a second channel-switching valve, through which the discharge pipe and the intake pipe of the compressor are connected, in parallel to the first channel-switching valve, and with which a third connection state where the intake pipe of the compressor and the equipment heat-exchanger are connected and a fourth connection state where the discharge pipe of the compressor and the equipment heat-exchanger are connected are switchable therebetween, wherein the air-conditioning heat-exchanger is connected to the first channel-switching valve and, at the same time, the equipment heat-exchanger is connected to the second channel-switching switch, so that the air-conditioning heat-exchanger and the equipment heat-exchanger are connected in parallel to the refrigerant circulation channel provided in the refrigeration cycle system, the air-conditioning heat-exchanger is connected to the expansion valve through an air-conditioning expansion valve that reduces pressure of the refrigerant, the equipment heat-exchanger is connected to the expansion valve through an equipment expansion valve that reduces pressure of the refrigerant, the air-conditioning heat-transfer medium circulation channel includes a first indoor heat-exchanger that performs heat-exchange between air introduced into the vehicle interior and the air-conditioning heat-transfer medium, and an air-conditioning circulation pump that circulates the air-conditioning heat-transfer medium between the air-conditioning heat-exchanger and the first indoor heat-exchanger, the equipment heat-transfer medium circulation channel includes a second indoor heat-exchanger that performs heat exchange between the air introduced into the vehicle interior and the equipment heat-exchanger, and an equipment circulation pump that circulates the equipment heat-transfer medium between the in-vehicle equipment and the equipment heat-exchanger, and the second indoor heat-exchanger is arranged on a downstream side of the flow of air from the first indoor heat-exchanger, so that the air to be introduced into the vehicle interior that has passed through the first indoor heat-exchanger can pass through the second indoor heat-exchanger.

2. A moving vehicle air-conditioning apparatus according to claim 1, further comprising:

a bypass channel that bypasses the second indoor heat-exchanger; and a flow control valve that controls flow rate of the cooling heat-transfer medium flowing through the second indoor heat-exchanger and the bypass channel.

3. A moving vehicle air-conditioning apparatus according to claim 2, further comprising:

a control device that controls air-conditioning of the vehicle interior and cooling of the equipment set up on the vehicle, wherein upon a cooling operation in which the outdoor heat-exchanger is operated as a condenser and the air-conditioning heat-exchange circuit and the cooling heat-exchanger are operated as evaporators, the control device controls the operation of the air-conditioning apparatus such that a portion or all of the cooling heat-transfer medium is flown to the second indoor heat-exchanger through the flow control valve to allow the air to be introduced into the vehicle interior that has been cooled in the first indoor heat-exchanger is heated in the second indoor heat-exchanger.

4. A moving vehicle air-conditioning apparatus according to claim 2, further comprising:

a control device that controls air-conditioning of the vehicle interior and cooling of the equipment set up on the vehicle, wherein the control device controls the operation of the air-conditioning apparatus such that an operation mode of the air-conditioning apparatus is switched by the first channel-switching valve to a heating operation mode in which the air-conditioning heat-exchange circuit is operated as a condenser and the outdoor heat-exchanger is operated as an evaporator, a flow of the refrigerant to the cooling heat-exchanger is shut off by the cooling expansion valve, and the cooling heat-transfer medium is flown into the second indoor heat-exchanger through the flow control valve.

5. A moving vehicle air-conditioning apparatus according to claim 4, wherein upon the heating operation, the control device controls the rotation speed of the compressor such that a temperature of the cooling heat-transfer medium reaches a target temperature.

6. A moving vehicle air-conditioning apparatus according to claim 2, further comprising:

a control device that controls air-conditioning of the vehicle interior and cooling of the equipment set up on the vehicle, wherein the control device controls the operation of the air-conditioning apparatus to be switched to a defrosting operation in which the outdoor heat-exchanger is operated as a condenser and the cooling heat-exchanger is operated as an evaporator, the flow of the refrigerant to the air-conditioning heat-exchange circuit is shut off by the air-conditioning expansion valve, and the cooling heat-transfer medium is flown into the bypass channel by the flow control valve, thereby defrosting the outdoor heat-exchanger.

7. A moving vehicle air-conditioning apparatus according to claim 6, further comprising:

an outdoor fan that blows air outside the vehicle interior into the outdoor heat-exchanger; and a detector that detects vehicle speed of the vehicle, wherein upon the defrosting operation, the control device controls the outdoor fan to be rotated in a direction opposite to a direction in which the outdoor fan is rotated upon non-defrosting operation so that the speed of rotation of the outdoor fan in the opposite direction is controlled in response to the vehicle speed.

8. A moving vehicle air-conditioning apparatus according to claim 1, further comprising:
a receiver tank wherein
the receiver tank is provided at a diverging point where the refrigerant discharged from the expansion valve in the refrigerant circulation channel of the refrigeration cycle system is diverged into a portion that flows through the air-conditioning heat-exchange circuit and a portion that flows through the cooling heat-exchange circuit.

9. A moving vehicle air-conditioning apparatus according to claim 1, further comprising:
a control device that controls air-conditioning of the vehicle interior and cooling of the equipment set up on the vehicle; and
a detector that detects a temperature of the air-conditioning heat-transfer medium, wherein
upon a cooling operation in which the outdoor heat-exchanger is operated as a condenser and the air-conditioning heat-exchange circuit is operated as an evaporator, the control device controls a rotation speed of the compressor such that a temperature of the air-conditioning heat-transfer medium is set to be a target temperature.

10. A moving vehicle air-conditioning apparatus according to claim 1, further comprising:
a control device that controls air-conditioning of the vehicle interior and cooling of the equipment set up on the vehicle;
a detector that detects a temperature of the air outside the vehicle interior; and
a detector that detects a temperature of the cooling heat-transfer medium, wherein
upon a cooling operation in which the air-conditioning heat-exchange circuit and the cooling heat-exchanger are operated as evaporators, the control device sets a target temperature of the cooling heat-transfer medium to a temperature higher than the temperature of the air outside the vehicle interior, and controls the cooling expansion valve such that the temperature of the cooling heat-transfer medium reaches the target temperature.

11. A moving vehicle air-conditioning apparatus according to claim 10, further comprising:
a detector that detects a temperature of the refrigerant that flows out from the air-conditioning heat-exchange circuit; and
a detector that detects a temperature of the refrigerant that flows out from the cooling heat-exchanger, wherein
upon the cooling operation, the control device controls the cooling expansion valve such that the temperature of the refrigerant that flows out from the cooling heat-exchanger is higher than the temperature of the refrigerant that flows out from the air-conditioning heat-exchange circuit.

12. A moving vehicle air-conditioning apparatus according to claim 1, further comprising:
a control device that controls air-conditioning of the vehicle interior and cooling of the equipment set up on the vehicle, wherein
upon a cooling operation in which the outdoor-heat-exchanger is operated as a condenser and the air-conditioning heat-exchange circuit is operated as an evaporator, the control device controls the operation of the air-conditioning apparatus such that the second channel-switching valve switches the flow of the refrigerant so that the cooling heat-exchanger is operated as a condenser to allow the cooling heat-transfer medium of the cooling heat-transfer medium circulation channel to be heated by the refrigerant in the refrigerant circulation channel of the refrigeration cycle system.

13. A moving vehicle air-conditioning apparatus according to claim 1, further comprising:
a control device that controls air-conditioning of the vehicle interior and cooling of the equipment set up on the vehicle, wherein
the control device controls the operation of the air-conditioning apparatus such that an operation mode of the air-conditioning apparatus is switched by the first channel-switching valve to a heating operation mode in which the air-conditioning heat-exchange circuit is operated as a condenser and the outdoor heat-exchanger is operated as an evaporator,
the cooling heat-exchanger is switched by the second channel-switching valve so as to be operated as an evaporator, and
the cooling heat-transfer medium is flown into the bypass channel by the flow control valve.

14. A moving vehicle air-conditioning apparatus according to claim 1, wherein
the air-conditioning apparatus includes a plurality pieces of equipment set up on the vehicle, and
the plurality of pieces of the equipment is arranged along a direction of flow of the cooling heat-transfer medium from upstream to downstream in order of increasing permissible temperature or increasing thermal time constant.

* * * * *